(12) United States Patent
Brandt

(10) Patent No.: US 10,346,280 B2
(45) Date of Patent: *Jul. 9, 2019

(54) MONITORING PERFORMANCE OF A PROCESSOR USING RELOADABLE PERFORMANCE COUNTERS

(71) Applicant: Intel Corporation, Santa Clara, CA (US)

(72) Inventor: Jason W. Brandt, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/703,860

(22) Filed: Sep. 13, 2017

(65) Prior Publication Data
US 2018/0004622 A1 Jan. 4, 2018

Related U.S. Application Data

(63) Continuation of application No. 15/011,094, filed on Jan. 29, 2016, now Pat. No. 9,766,997.

(51) Int. Cl.
| | | |
|---|---|---|
| G06F 9/46 | (2006.01) | |
| G06F 11/34 | (2006.01) | |
| G06F 9/48 | (2006.01) | |
| G06F 11/30 | (2006.01) | |
| G06F 13/24 | (2006.01) | |

(52) U.S. Cl.
CPC ........ *G06F 11/3466* (2013.01); *G06F 9/4812* (2013.01); *G06F 11/3024* (2013.01); *G06F 13/24* (2013.01)

(58) Field of Classification Search
None
See application file for complete search history.

(56) References Cited

U.S. PATENT DOCUMENTS

| | | |
|---|---|---|
| 9,223,979 B2 | 12/2015 | Fischer et al. |
| 2008/0046700 A1 | 2/2008 | Gara et al. |
| 2014/0013020 A1 | 1/2014 | Horsnell et al. |
| 2014/0059334 A1 | 2/2014 | Indukuru et al. |
| 2015/0254087 A1 | 9/2015 | Serebrin et al. |

FOREIGN PATENT DOCUMENTS

WO 2006-030381 A2 3/2006

OTHER PUBLICATIONS

International Search Report and Written Opinion dated Mar. 30, 2017, on application No. PCT/US2016/066001.

*Primary Examiner* — Gregory A Kessler
(74) *Attorney, Agent, or Firm* — Lowenstein Sandler LLP

(57) ABSTRACT

In accordance with embodiments disclosed herein, there is provided systems and methods for monitoring performance of a processor to manage events. A processor includes a first performance counter to increment upon occurrence of a first type of event in the processor and a second performance counter to increment upon occurrence of a second type of event in the processor. The processor is to reset the second performance counter in response to the first performance counter reaching a first limit.

20 Claims, 17 Drawing Sheets

200

202

204

206

208

210

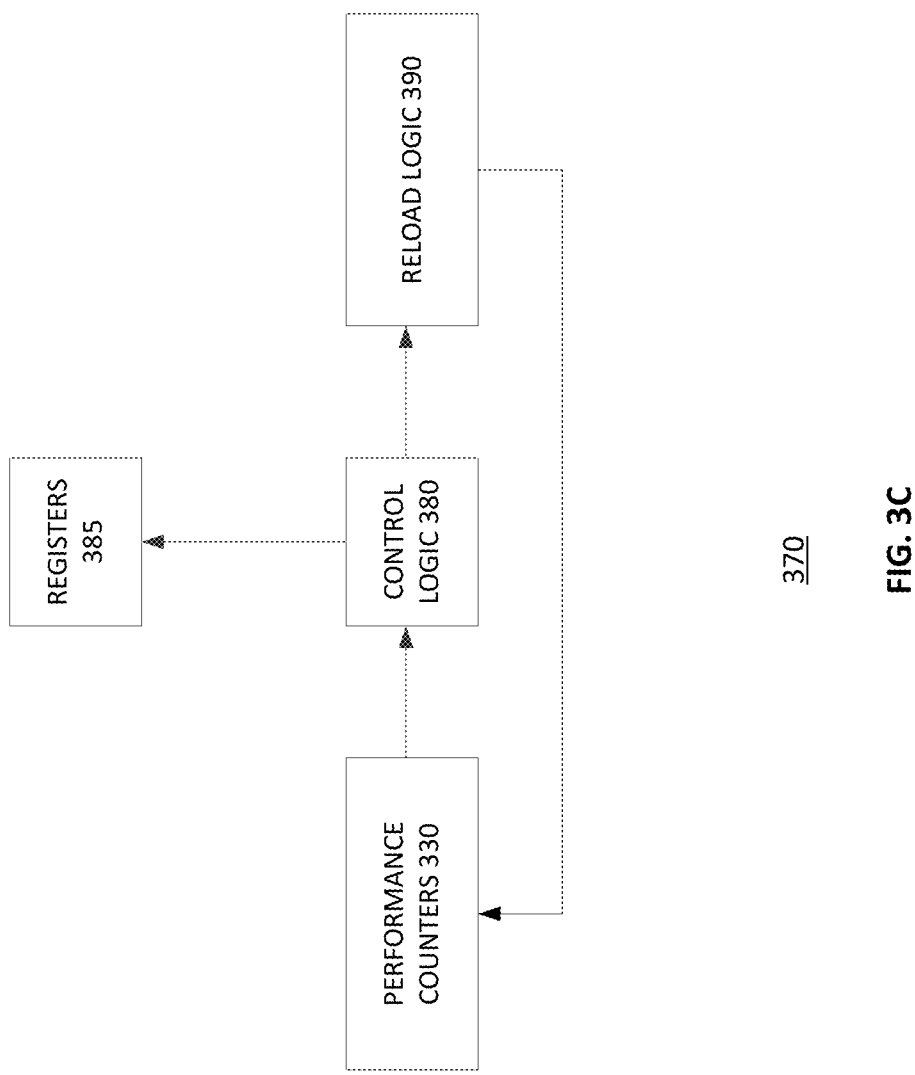

MONITORING PERFORMANCE OF A PROCESSOR USING RELOADABLE PERFORMANCE COUNTERS

CROSS-REFERENCE TO RELATED APPLICATIONS

This application is a continuation application of U.S. patent application Ser. No. 15/011,094, filed Jan. 29, 2016, the entire contents of which are hereby incorporated by reference.

TECHNICAL FIELD

The embodiments of the disclosure relate generally to a processor including a logic circuit for monitoring performance of the processor, and, more specifically, relate to monitoring performance of a processor using reloadable performance counters.

BACKGROUND

Performance analysis is the foundation for characterizing, debugging, and tuning a micro-architectural design, finding and fixing performance bottlenecks in hardware and software, as well as locating avoidable performance issues. As the computer industry progresses, the ability to analyze the performance of a microarchitecture and make changes to the microarchitecture based on that analysis becomes more complex and important.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

FIG. 3C is a block diagram illustrating architecture that includes logic circuits to monitor performance in accordance with one embodiment of the invention.

DETAILED DESCRIPTION

Figure 1:
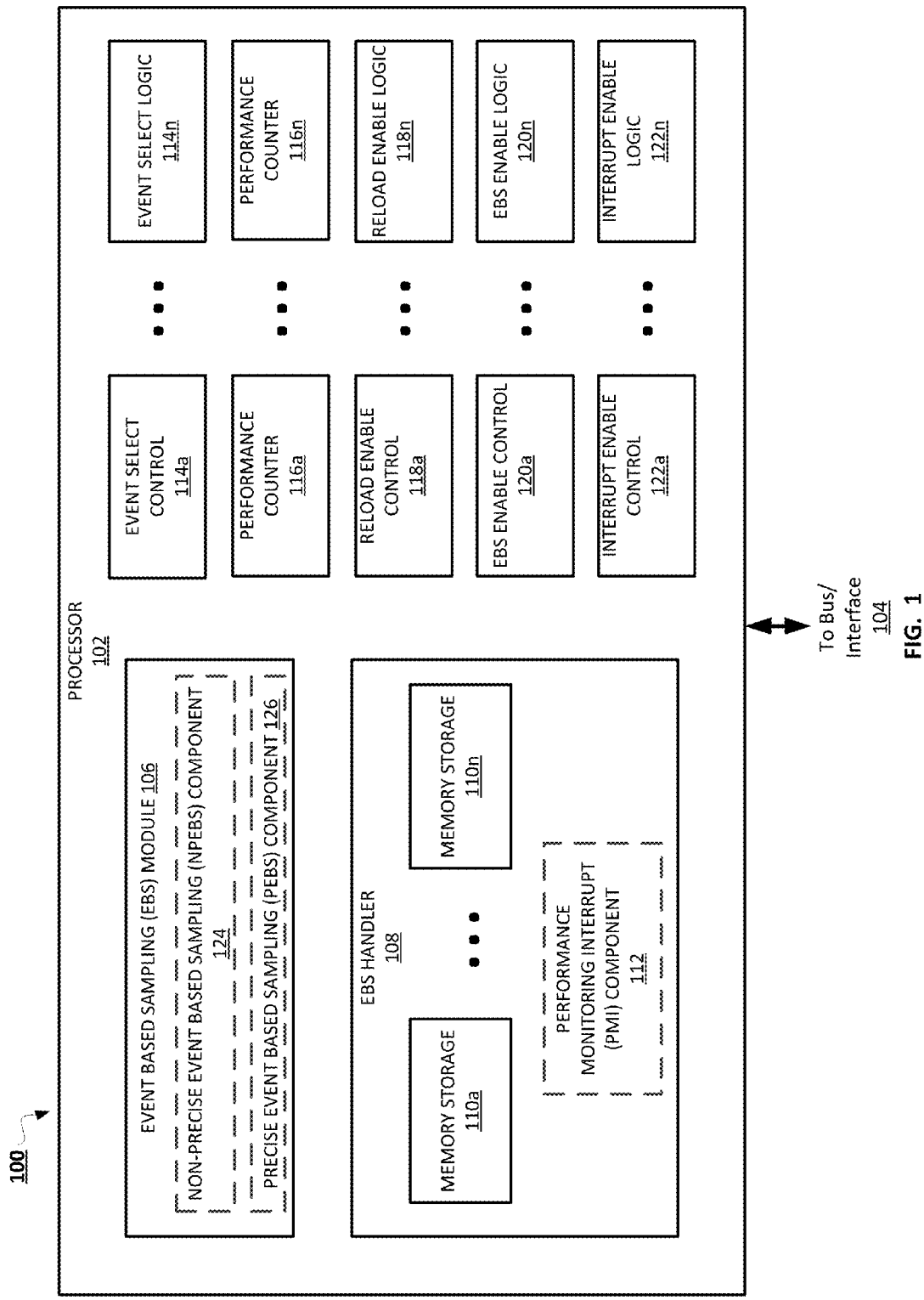
FIG. 1 is a block diagram of a system architecture of a processor, according to one embodiment of the disclosure.

Conventional techniques for monitoring performance of a processor include programming a performance counter to, after a specified number of occurrences of a monitored event, pend an interrupt and/or record information about a current state of the processor. This allows logging information (e.g., taking samples) about what was going on in the processor every specified number of events. For example, knowing what code was executed every 100,000 cycles from the logged information will give an idea of where the processor time was being spent. This does not give a direct mechanism to determine a rate of the event. Previously, to determine poor performance from the rate of events, many samples needed to be taken of at least two types of events and then software was used to analyze when one event occurred frequently and the other event did not. For example, performance counters could take many samples of both instructions retired and cycles and then software could be used to determine when there were very few instructions retired per cycle to determine poor performance. In another example, performance counters could take many samples of write operations to dynamic random access memory (DRAM) and cycles and then software could be used to determine when there were a higher than expected number of writes to DRAM per cycle. This could be used to determine the possibility of malicious software attacks, for example. This conventional approach involves taking many samples (e.g., recording, interrupts, and so forth) and using software, both of which slow down performance of a processor and add overhead.

Disclosed herein are embodiments for monitoring performance of a processor using reloadable performance counters. In some embodiments, the processor counts events and stores architectural meta-data regarding the events or generates an interrupt based on the ratio of two performance counters. Alternatively, more than two performance counters can be used to determine performance in other ways.

The operation of a processor may include the occurrences of multiple events that affect the performance of the system. The occurrences of the multiple events may be monitored to understand how to improve performance. In one embodiment, an event includes any operation, occurrence, or action in a processor (e.g., a cache miss). In another embodiment, an event may be the monitoring of any operation, occurrence, or action in a processor (e.g., a signal going high to a cause a performance counter to increment because a cache miss occurred). In one embodiment, the event is a response to a given instruction and data stream in the processor. In another embodiment, the event is a reference clocktick, core clocktick, or cycle. The events may be associated with architectural metadata including state information of the processor including, but not limited to, an instruction pointer, a time stamp counter, and register state. Alternatively, the events may be other operations, occurrences, or actions.

In some embodiments, a processor may include two or more performance counters. A first performance counter is configured to count a first type of event in the processor from a first starting value to a first limit. A second performance counter is configured to count a second type of event in the processor from a second starting value to a second limit. When the first performance counter reaches the first limit, the processor resets the second performance counter to a second reload value. When the second performance counter reaches the second limit, the processor may generate a performance record or a performance monitoring interrupt (PMI). Reaching a limit may also be known as an overflow. To trigger an overflow, a performance counter is preset to a modulus value that may cause the performance counter to overflow after a specific number of events have been counted, which causes one or more performance counters to be reset and/or generates either a PMI or a performance record, such as an event based sampling (EBS) record, as described in detail herein below.

The above technique of using a first performance counter to reset a second performance counter and generating a record and/or interrupt when the second performance counter reaches the second limit has many advantages. One such advantage is that generating a record and/or interrupt when the second performance counter overflows before being reset can reduce the amount of interrupts and/or information recorded in monitoring performance of a processor. For example, if the first limit is 5,000 instructions retired and the second limit is 20,000 cycles, an expected rate may be over 5,000 instructions retired per 20,000 cycles. When the processor is performing at the expected rate, a record and/or interrupt will not be generated. Less than 5,000 instructions retired per 20,000 cycles may indicate poor performance of the processor and a record and/or interrupt would then be generated and stored. Previously, a record, sample, and/or interrupt would be generated and stored every specific number of events regardless if the processor is performing at the expected rate or not. Each sample causes some overhead, so constantly taking samples causes increased performance overhead and slowdown. The slowdown is not limited to cases of behavior of interest (e.g., less than 5,000 instructions retired per 20,000 cycles, and so forth), but is applicable continuously while the processor is running at an expected rate and while the processor is not running at an expected rate. Thus, reducing the number of samples taken while monitoring performance of a processor is advantageous.

Another advantage of utilizing a first performance counter to reset a second performance counter is avoiding the use of software to determine if the processor is operating at an expected rate of an event. For example, if the first limit of the first performance counter is 5,000 instructions retired and if the second limit of the second performance counter is 20,000 cycles, a record and/or interrupt will not be generated if the rate is more than the expected rate of more than 5,000 instructions retired per 20,000 cycles. If the first limit is not reached before the second limit is reached (i.e., an unexpected rate), a record is generated and stored including architectural metadata defining a state of the processor at a time of the generation of the record. The state of the processor may include how many instructions were retired. The reloadable performance counters thereby do not generate a record when the processor is operating at the expected rate of an event, but do generate and store a record when the processor is not operating at the expected rate of an event. Previously, many samples would need to be collected of a first event and a second event and then the samples would need to be compared by post-processing software to determine relative rates. For example, every specific number of events, the processor would determine how many instructions were retired and how many cycles had occurred. Software would then calculate the instructions retired per cycle for the samples taken. The additional use of software would cause system slowdown and additional system overhead. Overhead is problematic because it can perturb the system that is being debugged. Thus, reducing or eliminating the use of software to determine if a processor is performing at an expected rate is advantageous.

FIG. 1 illustrates a system architecture 100 that includes an EBS module 106 and components of an EBS mechanism according to an embodiment of the present disclosure. In an embodiment, the system architecture may be a system-on-a-chip hardware circuit block that may be implemented on a single die (same substrate) and within a single semiconductor package. The processing unit may be a central processing unit (CPU) or a graphic processing unit (GPU). Embodiments of the disclosure may be compact circuits, and therefore may be implemented as an integral part of a wide range of processing units without incurring significant increase of cost and power consumption. Embodiments of the disclosure may be programmable circuit logics, and therefore may be used to track and manage different types of events on the same circuit logics (e.g., microcode). The EBS module 106 is also extensible to track multiple processing units. The EBS module 106 may be shared by a plurality of applications running on the same processor and managed by an operating system (OS) or a virtual machine as a shared resource.

Referring to FIG. 1, the processing unit may include a processor 102 coupled to a bus/interface 104.

The processor 102 may include one or more performance counters 116a to 116n (referred to herein as "performance counter 116"). A first performance counter 116a may increment upon occurrence of a first type of event in the processor 102 from a first starting value to a first limit. A second performance counter 116b may increment upon occurrence of a second type of event in the processor 102 from a second starting value to a second limit.

The processor 102 may include one or more event select (ES) controls 114a to 114n (referred to herein as "ES control 114"), corresponding to one or more performance counters 116a to 116n. The ES control 114 may be programmed with an identifier of a type of event and the performance counter 116 may be enabled via the ES control 114 to increment upon occurrence of the first type of event. For example, a first ES control 114a may be programmed with a first identifier of the first type of event, where the first performance counter 116a is enabled via the first ES control 114a to increment upon occurrence of the first type of event and a second ES control 114b may be programmed with a second identifier of the second type of event, where the second performance counter 116b is enabled via the second ES control 114b to increment upon occurrence of the second type of event.

The processor 102 may include one or more reload enable controls 118a to 118n (referred to herein as "reload enable control 118"), corresponding to one or more performance counters 116a to 116n. Reload enable control 118 may include a plurality of reload enable bits. For example, performance counter 116a may have multiple reload enable control bits and each reload enable control bit either indicates which performance counter (e.g., performance counter 116b, 116c, and so forth) gets reloaded/reset upon overflow of the performance counter 116a or the overflow of which performance counter (e.g., performance counter 116b, 116c, and so forth) will cause the performance counter 116a to reload/reset. The reload enable bits may be software-visible control bits. Control logic may receive an indication of a performance counter 116 reaching a corresponding limit, control logic may access a reload enable bit, and control logic may send a control signal in view of the reload enable bit. A reload logic may reset a performance counter corresponding to the reload enable bit to a corresponding reload value in response to receiving the control signal from the control logic. For example, control logic may receive an indication of the first performance counter 116 reaching the first limit, access a first reload enable bit, and send a first control signal in view of the first reload enable bit. A reload logic may reset the second performance counter to a second reload value in response to receiving the first control signal from the control logic. In one embodiment, reload enable controls 118a-118n may be located in a single logic register (e.g., a software-visible register, a model specific register, and so forth). In another embodiment, each reload enable control 118 may be located in a separate logic register.

In another embodiment, at least one reload enable control 118 includes reload enable bits to reload other performance counters 116, but not to reset the corresponding performance counter 116 to a corresponding reload value (e.g., reload enable control 118a may have reload enable bits to reload performance counter 116b, 116c, and so forth, but does not have a reload enable bit to reset performance counter 116a). In one embodiment, a performance counter 116 may automatically reset itself when it reaches a corresponding limit without control logic accessing a reload enable bit.

The processor 102 may include an EBS component to generate an EBS record in response to the second performance counter 116b reaching the second limit. The EBS record may include architectural metadata defining a state of the processor 102 at a time of generation of the EBS record. In one embodiment, the EBS component is an EBS handler 108. In one embodiment, the EBS handler 108 is part of the processor. In another embodiment, the EBS handler is software (e.g., microcode).

In one embodiment, EBS handler 108 includes one or more memory storage 110a to 110n (referred to herein as "memory 110"). For example, memory storage 110 may store the EBS record generated in response to the second performance counter 116b reaching the second limit. In one embodiment, the EBS handler 108 has a single memory storage area that holds EBS records (e.g., precise EBS (PEBS) records, non-precise EBS (NPEBS) records, and so forth) for each performance counter 116. For example, a single memory storage area may hold EBS records that occur from a plurality of performance counters 116. A field in the EBS record may indicate which performance counter 116 generated the record. In another embodiment, there may be separate memory storage areas for different performance counters 116. For example, memory storage 110a may store EBS records for performance counter 116a, memory storage 110b may store EBS records for performance counter 116b, and so forth. In one embodiment, the memory storages 110 are physical memory storages (e.g., memory available on a system, memory visible to a hypervisor as available on a system, etc.). In another embodiment, the memory storages 110 are virtual memory storages (e.g., continuous virtual address space presented by a guest operating system to applications, memory that is visible to the applications running inside a virtual machine, etc.). In another embodiment, the memory storages 110 are guest physical memory storages (e.g., memory visible to a guest operating system running in a virtual machine, etc.). The memory storages 110 may be a buffer. A buffer can be in physical memory, virtual memory, guest physical memory, a static random access memory (SRAM) accessed via an alternative addressing mechanism, and so forth.

In one embodiment, the EBS handler 108 may include a performance monitoring interrupt (PMI) component 112. The PMI component 112 may cause a performance interrupt upon EBS record generation (e.g., when memory storage 110 reaches a certain threshold or after a specific number of EBS records are generated).

The processor 102 may include one or more EBS enable controls 120a to 120n (referred to herein as "EBS enable control 120"), corresponding to one or more performance counters 116a to 116n. The EBS handler 108 may be enabled via an EBS enable control 120 to generate the EBS record in response to the performance counter 116 reaching the corresponding limit. For example, the EBS handler 108 may be enabled via a second EBS enable control 120b to generate an EBS record in response to the second performance counter 116b reaching the second limit. In some implementations, EBS enable controls 120a-120n may be located in a single logic register (e.g., a model specific register). In another embodiment, the EBS enable control 120 for performance counter 116 may be located in a register dedicated to the performance counter 116 (e.g., a first EBS enable control 120a for a first performance counter 116a may be located in a register dedicated to the first performance counter 116a).

The processor 102 may include an interrupt component to generate an interrupt in response to the second performance counter 116b reaching the second limit. In one embodiment, the interrupt component may be enabled via one or more interrupt enable controls 122a to 122n (referred to herein as "interrupt enable control 122") corresponding to one or more performance counters 116a to 116n. For example, the interrupt component may be enabled via a second interrupt enable control 122b to generate an interrupt in response to the second performance counter 116b reaching the second limit. The interrupt enable control 122 may be provided as a model specific register (MSR).

In one embodiment, the processor 102 may include an EBS module 106. The EBS module 106 may include a non-precise event based sampling (NPEBS) component 124 and a precise event based sampling (PEBS) component 126.

The processor 102 may include various other known components (not shown) to perform algorithms to process data, in accordance with the present invention. For example, the processor 102 may include a memory (not shown) such as a Level 1 (L1) internal cache. Depending on the architecture, the processor 102 may have a single internal cache or multiple levels of internal cache. Alternatively, in another embodiment, the cache memory may reside external to the processor 102. Other embodiments may also include a combination of both internal and external caches depending on the particular implementation and needs.

Processor 102 may execute a stream of instructions that may be embedded with markers for events that may be placed on a bus/interface 104. The execution of a segment of instructions may constitute one or more events. In one embodiment, the event is generated by the processor 102. In another embodiment, the event is generated outside the processor 102 and communicated to the processor via the bus/interface 104.

In one embodiment, ES control 114 is programmed with an identifier of an event. The ES control 114 may be provided as a MSR. The programming of the ES control 114 causes a performance counter 116 corresponding to the programmed ES control 114 to track occurrences of the particular programmed event. In one embodiment, the programmed ES control 114 may track occurrences of a precise event. In another embodiment, the programmed ES control 114 may track occurrences of a non-precise event. In some embodiments, the programmed ES control 114 may track occurrences of either a precise or non-precise event depending on how the ES control 114 was programmed. In some embodiments, any event that is not defined as a precise event is considered a non-precise event. In one embodiment, the ES control 114 is programmed by an executing application. In another embodiment, the ES control 114 is programmed by an operating system/driver. In another embodiment, the ES control 114 is programmed by a virtual machine manager (VMM).

When the ES control 114 is programmed with an event identifier, the performance counter 116 corresponding to the ES control 114 is incremented upon each occurrence of the programmed event. In one embodiment, when the second performance counter 116b reaches the second limit, an action may be triggered (e.g., generating an EBS record, generating an interrupt, changing mode, writing a state bit, starting another counter counting, pulling a pin that is visible to another chip, and so forth).

An EBS enable control 120 corresponding to the ES control 114 and the performance counter 116 may be set (e.g., activated, flag set, bit set to 1, etc.) to enable the EBS handler 108 to generate an EBS record upon overflow of the performance counter 116. In one embodiment, the user sets the EBS enable control 120. In one embodiment, the EBS module 106 may be enabled via the EBS enable control 120 to cause the EBS handler 108 to generate an EBS record. In another embodiment, the EBS enable control 120 includes an EBS_EN bit, which is set to enable the EBS handler 108 to generate an EBS record upon overflow of the performance counter 116 that is counting the event. In one embodiment, the EBS module 106 may cause the EBS handler 108 to generate an EBS record upon overflow of the performance counter 116 that is counting the event. As discussed above, an EBS record includes architectural metadata of a state of the system upon the overflow of the performance counter. The architectural metadata may include, but is not limited to, an Instruction Pointer (IP), Time Stamp Counter (TSC), or register state, for example. As such, the EBS record not only allows the location of the events in the instruction trace to be accurately profiled, but also provides for additional information for use in software optimization, hardware optimization, performance tuning, etc.

An interrupt enable control 122 corresponding to the performance counter 116 may be set (e.g., activated, flag set, bit set to 1, etc.) to generate an interrupt upon overflow of the performance counter 116. In one embodiment, the user sets the interrupt enable control 122. In one example, the interrupt enable control 122 includes an INT_EN bit (e.g., interrupt enable control bit in an MSR, INT bit in IA32_PERFEVTSELx, etc.). The interrupt bit may cause the performance counter overflow to pend an interrupt (e.g., PMI). In one embodiment, a PMI can be configured to cause a non-maskable interrupt (NMI). In another embodiment, the PMI can be configured to cause a system-mode-interrupt (SMI). In another embodiment, the PMI can be configured to cause an initialize (INIT).

In one embodiment, if a performance counter 116 does not have an interrupt or a record capability, the performance counter would not have an enable bit in IA32_EBS_ENABLE or an INT bit (e.g., IA32_APERF, and IA32_MPERF, and so forth). In another embodiment, a performance counter 116 may always generate interrupts on an overflow without any enable bit needing to be set. In another embodiment, a performance counter 116 may always generate an EBS record on overflow without any enable bit needing to be set.

In one embodiment, the EBS module 106 is enabled by the second EBS enable control 120b to cause the EBS handler 108 to generate an EBS record when the second performance counter 116b reaches the corresponding limit. When the second performance counter 116b reaches the corresponding limit, control logic may access one or more of the second EBS enable control 120b, the second interrupt enable control 122b, and the second reload enable control 118b. In one embodiment, the EBS module 106 is enabled via the second EBS enable control 120b to cause the EBS handler 108 to generate and store the EBS record. In another embodiment, the EBS handler 108 is enabled via the second EBS enable control 120b to generate and store the EBS record. In another embodiment, interrupt component is enabled via the second interrupt enable control 122b to generate an interrupt. Accordingly, the architectural metadata associated with the event may be captured or an interrupt may be generated when the second performance counter 116b reaches the second limit before being reset by the first performance counter 116a meeting the first limit. In some embodiments, the EBS module 106 controls timing of generation of the EBS record or interrupt for the event. In one embodiment, the EBS handler 108 may generate the EBS record. In another embodiment, the interrupt enable control 122 may generate the interrupt. In another embodiment, the EBS handler 108 is used to collect some records and then a PMI is pended (e.g., through the PMI component 112) so that software can collect more information (e.g., what an application is currently executing, what a software thread is currently executing, etc.)

In one embodiment, the EBS module 106 may cause the EBS handler 108 to generate the EBS record or interrupt for the event immediately upon occurrence of the overflow of the performance counter 116 tracking and counting the programmed event, even in the middle of an instruction.

In another embodiment, the EBS module 106 may cause the EBS handler 108 to generate the EBS record or interrupt for the event as soon as the current instruction completes (retires) when the overflow occurs. The event may be a non-precise event.

In another embodiment, the EBS module 106 may cause the EBS handler 108 to generate the EBS record or interrupt for the event immediately when the event occurs again after the performance counter 116 has overflowed. In one embodiment, this is the very next event (e.g., overflow+1). In another embodiment, some events may be missed due to skid or shadowing. The EBS module 106 may be attempting to generate an EBS record for the first event after overflow (e.g., in the middle of an instruction, waiting until completion of the current instruction, and so forth). The skid may occur when the next event occurs so soon after overflow that the EBS module 106 does not know yet that the performance counter 116 overflowed (e.g., due to distance between the performance counter 116 and the EBS module 106), causing the EBS record to not be generated when the event occurs (e.g., causing the EBS record to be generated at overflow+2, overflow+3, overflow+4, and so forth instead of overflow+1). The highest overflow+x that could occur depends on the distance between the overflow occurring and the EBS module 106. This is referred to as a skid. The skid generates a shadow which hides occurring events between the overflow and the generating of the record or the interrupt. The event may be a precise event.

In one embodiment, the PMI component 112 is used to sample and collect information and not EBS records. In another embodiment, the EBS handler 108 collects information and then a PMI is pended so that software can collect more information (e.g., what application is currently executing, what software thread is currently executing, etc.).

Figure 2A:
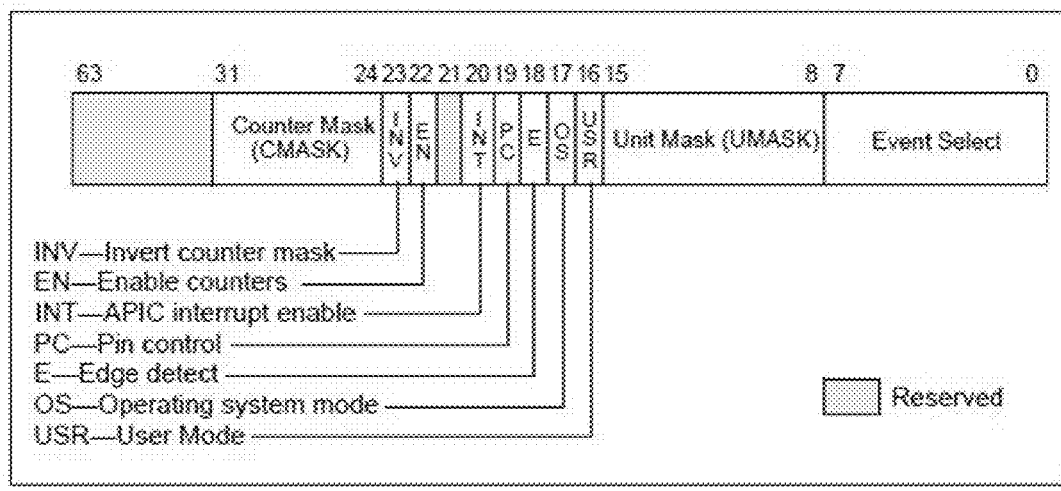
FIG. 2A illustrates a layout of bit fields for a model specific register according to one embodiment of the disclosure.

FIG. 2A illustrates exemplary layout 200 of bit fields for event select (ES) control MSR in accordance with one embodiment of the present invention. The ES control MSR may be the same as ES control 114 described with respect to FIG. 1. The layout 200 of the ES control MSR may provide a comprehensive, standardized layout for utilizing event select controls and performance counters as the MSRs in the processor to manage events. In an embodiment, the layout 200 may be a register(s) file, which may include individual bit positions corresponding to each component in the processor. The layout 200 may include event select bits 0 through 7 to identify the events generated in the processor. As discussed above, an event may be a precise event or a non-precise event.

The layout 200 may also include unit mask (UMASK) bits 8 through 15, each of which defines specific architectural state information of the processor. The layout 200 may also include a user mode (USR) bit 16, which specifies the selected architectural state is counted only when the processor is operating at privilege levels (e.g., user privilege levels, application privilege levels, >0 privilege levels, and so forth), for example, levels 1, 2 or 3. The layout 200 may also include an operating system (OS) mode bit 17, which specifies that the selected architectural state is counted only when the processor is operating at the privilege level 0.

The layout 200 may also include an edge detect (E) bit 18, which enables (when set) edge detection of the selected architectural state. The processor may count the number of deasserted to asserted transitions for any state that may be expressed by the other bits. In one embodiment, such mechanism does not permit back-to-back assertions to be distinguished and allows software to measure not only the fraction of time spent in a particular state, but also the average length of time spent in such a state (for example, the time spent waiting for an interrupt to be serviced). The layout 200 may further include a pin control (PC) bit 19, which when set causes the processor to toggle PMI pins and increments the performance counter when performance monitoring events occur and when clear, the processor toggles the PMI pins when the performance counter overflows. The toggling of a pin is defined as assertion of the pin for a single bus clock followed by deassertion.

The layout 200 may further include an advanced programmable interrupt controller (APIC) interrupt enable (INT) bit 20 (e.g., interrupt enable control 122 of FIG. 1), which when set, causes the processor to generate a PMI interrupt through its local APIC on the performance counter overflow. In one embodiment, the PMI Local Vector Table (LVT) entry is triggered by a performance counter overflowing when the INT bit of that performance counter is set. This triggering will lead to a PMI interrupt if the PMI LVT entry is not masked or disabled. The layout 200 may further include an enable counter (EN) bit 22, which, when set, causes the corresponding performance counter to be enabled. The performance counter may be the same as performance counter 116 described with respect to FIG. 1. When the EN bit 22 is cleared, the corresponding performance counter is disabled. In one embodiment, the event logic unit for a counter-mask (CMASK) is disabled by setting the EN bit 23 to 0 before writing into the performance counter. The layout 200 may further include an invert (INV) bit 23, which when set, inverts the counter-mask (CMASK) comparison, so that both greater than or equal to and less than comparisons can be made (For example, 0: greater than or equal; 1: less than).

Figure 2B:
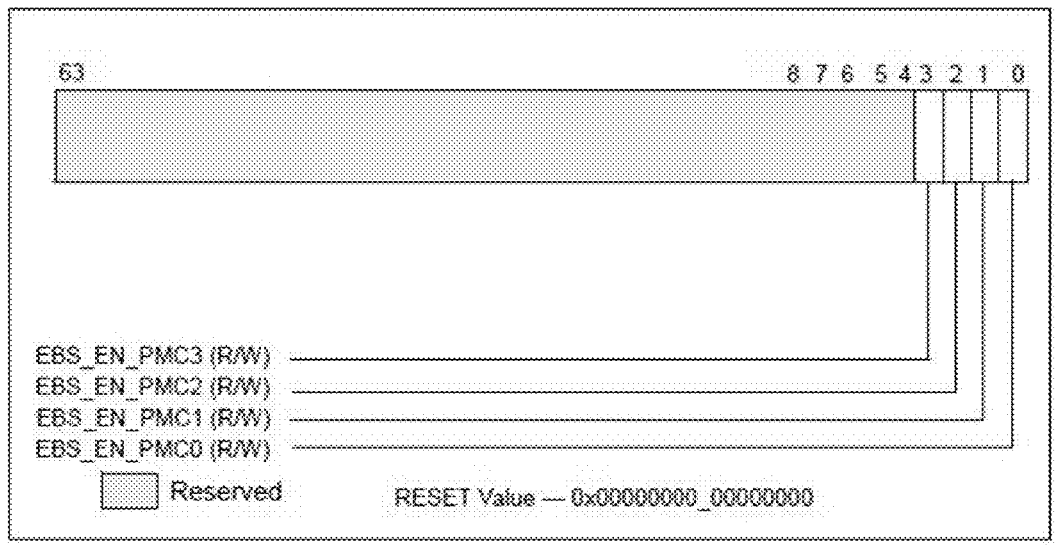
FIG. 2B illustrates a layout of bit fields for a model specific register according to one embodiment of the disclosure.

FIG. 2B illustrates exemplary layout 202 of bit fields for the EBS enable control MSR in accordance with one embodiment of the present invention. In one embodiment, the EBS enable control MSR is the same as EBS enable control 120 described with respect to FIG. 1. The layout 202 may provide a comprehensive, standardized layout for utilizing the EBS enable control as the MSR in the processor to manage events. In an embodiment, the layout 202 may be a register(s) file, which may include individual bit positions corresponding to each component in the processor. The layout 202 may include EBS enable control bits 0 through 3 (EBS_EN_PMC0, EBS_EN_PMC1, EBS_EN_PMC2, EBS_EN_PMC3), which are enabled to indicate when an overflow condition in a particular performance counter (e.g., performance counter 116 of FIG. 1) causes a EBS record to be generated and stored in memory storage of the EBS handler (e.g., EBS handler 108 of FIG. 1) or causes an interrupt to be generated by the EBS handler.

Figure 2C:
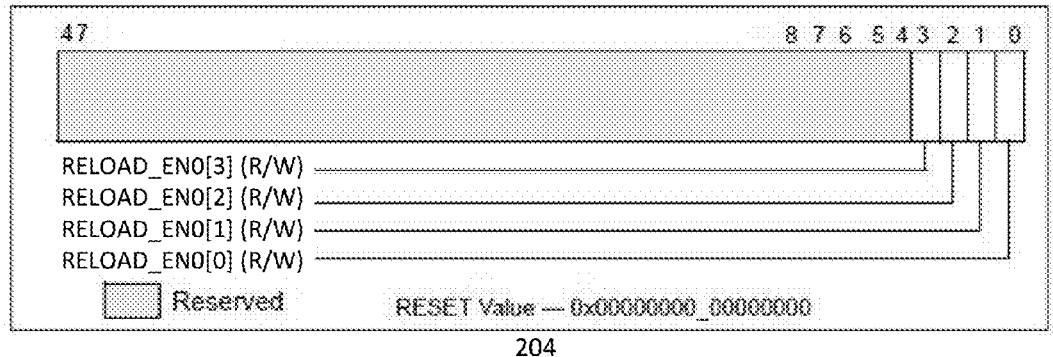
FIG. 2C illustrates layouts of bit fields for model specific registers according to one embodiment of the disclosure.
Figure 2C:
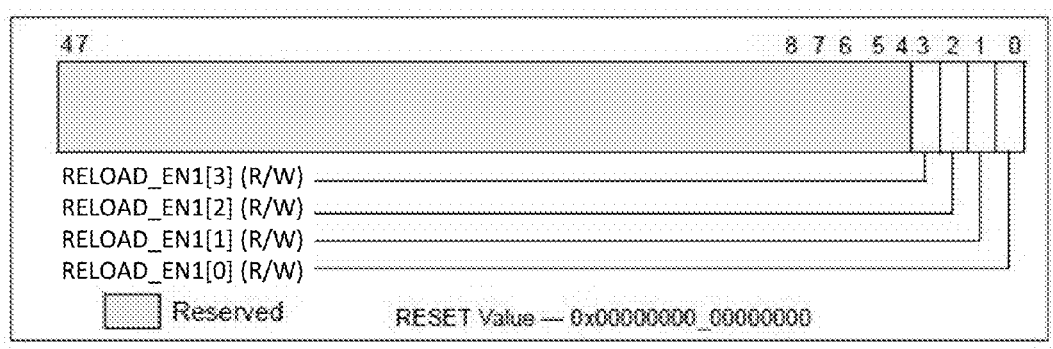
Figure 2C:
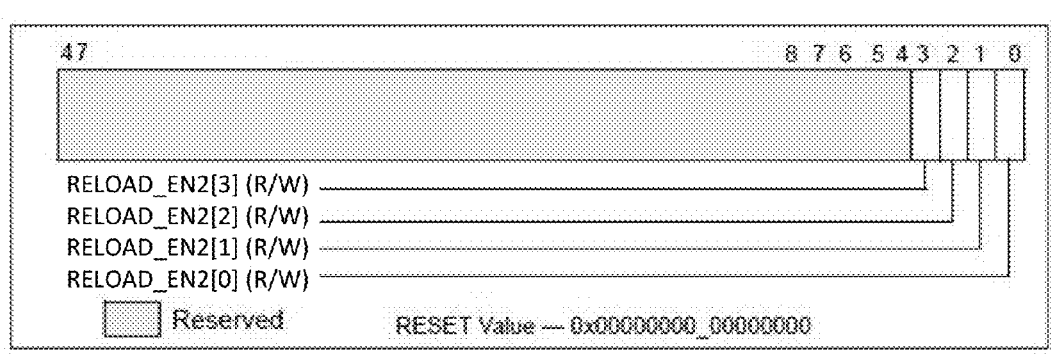
Figure 2C:
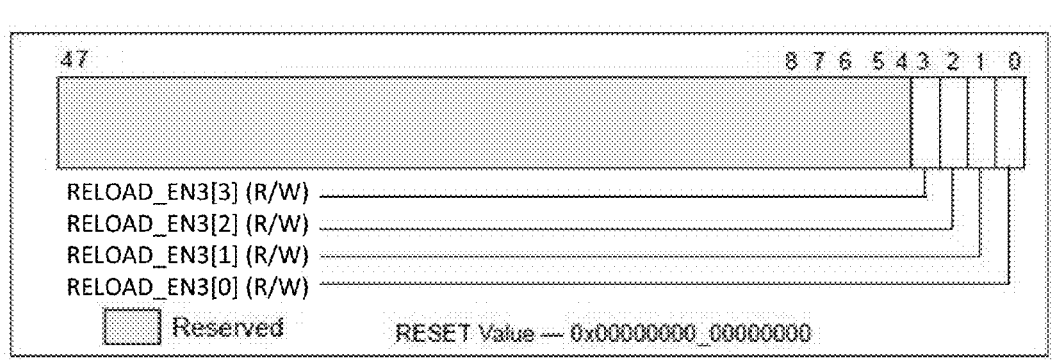

FIG. 2C illustrates exemplary layouts 204-210 of bit fields for the performance counters (e.g., performance counters 116 of FIG. 1). The bit fields in the layouts 204-210 may be in four separate MSRs (e.g., a MSR for 204, a MSR for 206, and so forth) in accordance with one embodiment of the present invention. Each of the layouts 204-210 may provide a comprehensive, standardized layout for utilizing a performance counter as a MSR in the processor to manage events. In an embodiment, each of the layouts 204-210 may be a register(s) file, which may include individual bit positions corresponding to each component in the processor. Each of the layouts 204-210 may include reload enable bits 0 through 3 (e.g., RELOAD_ENX[0] , RELOAD_ENX[1], RELOAD_ENX[2], RELOAD_ENX[3]) for a specific performance counter (X) (e.g., one or more of performance counters 116a-n of FIG. 1), where each bit is enabled to reset a performance counter to a corresponding reload value when the specific performance counter (X) reaches the corresponding limit. In one embodiment, the four separate MSRs may be the same as reload enable controls 118 of FIG. 1 (e.g., reload enable control 118a for 204, reload enable control 118b for 206, and so forth).

In one embodiment, each performance counter may have one reload enable bit for each of the performance counters, including itself, so the number of reload enable bits is n*n (n being the number of performance counters). For example, if there are four performance counters, there would be sixteen reload enable bits. The reload enable bits per performance counter may be in a separate MSR. For example, for four performance counters, there may be four MSRs (e.g., RELOAD_EN0 MSR, RELOAD_EN2 MSR, and RELOAD_EN3 MSR) and each MSR may have four bits.

In another embodiment, each performance counter may have one reload enable bit for each of the other performance counters (e.g., not including itself), so the number of reload enable bits is n*(n−1). For example, if there are four performance counters, there would be twelve reload enable bits.

Layout 204 displays a bit field for the performance counter 0 MSR (RELOAD_EN0 MSR). Reload enable bit 0 (RELOAD_EN0[0]) may cause performance counter 0 to be reloaded when performance counter 0 reaches the corresponding limit, reload enable bit 1 (RELOAD_EN0[1]) may cause performance counter 1 to be reloaded when performance counter 0 reaches the corresponding limit, and so forth.

Layout 206 displays a bit field for the performance counter 1 MSR (RELOAD_EN1 MSR). Reload enable bit 0 (RELOAD_EN1[0]) may cause performance counter 0 to be reloaded when performance counter 1 reaches the corresponding limit, reload enable bit 1 (RELOAD_EN1[1]) may cause performance counter 1 to be reloaded when performance counter 1 reaches the corresponding limit, and so forth.

Layout 208 displays a bit field for the performance counter 2 MSR (RELOAD_EN2 MSR). Reload enable bit 0 (RELOAD_EN2[0]) may cause performance counter 0 to be reloaded when performance counter 2 reaches the corresponding limit, reload enable bit 1 (RELOAD_EN2[1]) may cause performance counter 1 to be reloaded when performance counter 2 reaches the corresponding limit, and so forth.

Layout 210 displays a bit field for the performance counter 3 MSR (RELOAD_EN3 MSR). Reload enable bit 0 (RELOAD_EN3[0]) may cause performance counter 0 to be reloaded when performance counter 3 reaches the corresponding limit, reload enable bit 1 (RELOAD_EN3[1]) may cause performance counter 1 to be reloaded when performance counter 3 reaches the corresponding limit, and so forth.

In another embodiment, the MSR corresponding to a performance counter may have bit 0 that causes the performance counter corresponding to the MSR to be reloaded when performance counter 0 reaches the corresponding limit, bit 1 that causes the performance counter corresponding to the MSR to be reloaded when performance counter 1 reaches the corresponding limit, and so forth. For example, RELOAD_EN1[3] (bit 3 of MSR 1) may cause performance counter 1 to be reloaded when performance counter 3 reaches the corresponding limit, RELOAD_EN2[0] (bit 0 of MSR 2) may cause performance counter 2 to be reloaded when performance counter 0 reaches the corresponding limit, and so forth.

In another embodiment, either a subset of performance counters would be able to reload other performance counters or a performance counter would only be able to reload a subset of other performance counters. This may reduce the number of MSRs and/or bits needed for a given number of performance counters (e.g., for 32 performance counters, 32*32 reload enable controls may be unnecessarily expensive).

Table 1 illustrates an example of reload enable bits (e.g., Initialize counter0, Initialize counter1, and so forth) which when set can cause reset of the indicated performance counter (e.g., Counter 0, Counter 1, and so forth) to a reload value (e.g., IA32_COUNTER0_DEFAULT, IA32_COUNTER1_DEFAULT, etc.) when the performance counter overflows. The reload enable bits of Table 1 may be added to existing MSRs (e.g., the IA32_PERFEVTSELx MSRs, the MSR of FIG. 2A, and so forth).

TABLE 1

| IA32_PERFEVTSELx MSR (where x is any of 0, 1, 2, 3) [63:32] (lower bits unchanged) | | |
|---|---|---|
| Bit | Name | Description |
| 32 | Initialize counter0 | Initialize counter 0 to IA32_COUNTER0_DEFAULT when Counter X overflows unless Counter 0 had previously overflowed |
| 33 | Initialize counter1 | Initialize counter 1 to IA32_COUNTER1_DEFAULT when Counter X overflows unless Counter 1 had previously overflowed |
| 34 | Initialize counter2 | Initialize counter 2 to IA32_COUNTER2_DEFAULT when Counter X overflows unless Counter 2 had previously overflowed |
| 35 | Initialize counter3 | Initialize counter 3 to IA32_COUNTER3_DEFAULT when Counter X overflows unless Counter 3 had previously overflowed |
| 63:36 | Reserved | Reserved 0. Fault/VMX failure on attempt to set to 1 |

Additional bits could be added to Table 1 to include fixed counters. For example, bits 48, 49, and 50 could be an example of reload enable controls to reset fixed counters (e.g., fixed counter 1, fixed counter 2, fixed counter 3, and so forth) to a reload value when a performance counter overflows. Additionally, similar bits could be added to a fixed counter MSR (IA32_FIXED_CTR_CTRL or a new MSR) to allow a fixed performance counter to reload other fixed performance counters or general purpose performance counters when the fixed performance counter reaches the corresponding limit. In one embodiment, to reduce cost, the bits could be added to only a few of the MSRs.

Figure 3A:
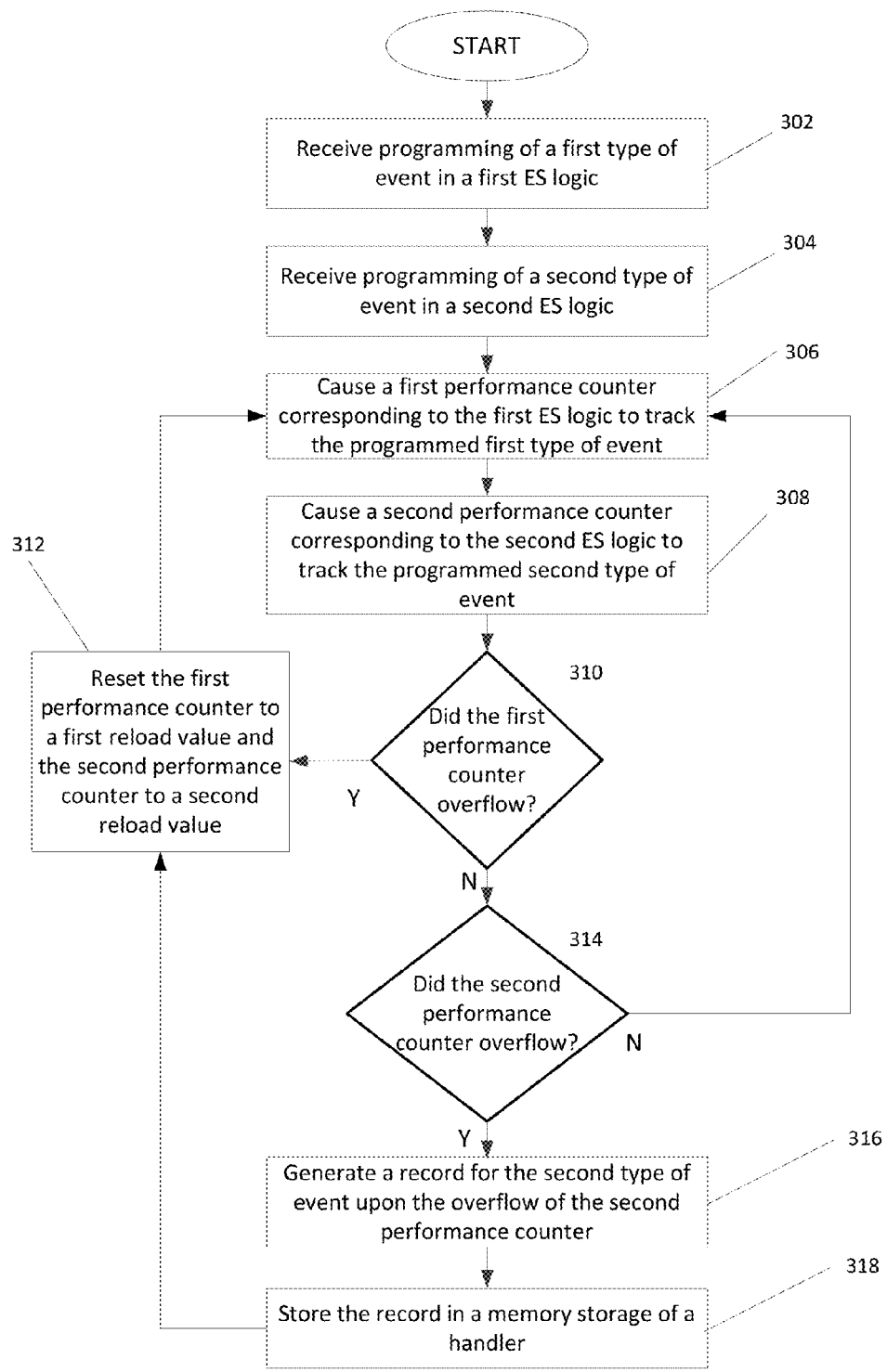
FIG. 3A is a flow diagram of a method for monitoring performance of a processor to manage events according to one embodiment of the disclosure.

FIG. 3A is a flow diagram of a method for monitoring performance of a processor to manage events according to an embodiment of the disclosure. Method 300 may be performed by processing logic that may include hardware (e.g., circuitry, dedicated logic, programmable logic, microcode, etc.), software (such as instructions run on a processor, a general purpose computer system, or a dedicated machine), firmware, microcode, or a combination thereof. In one embodiment, method 300 may be performed, in part, by processor 102 described above with respect to FIG. 1.

For simplicity of explanation, the method 300 is depicted and described as a series of acts. However, acts in accordance with this disclosure can occur in various orders and/or concurrently and with other acts not presented and described herein. Furthermore, not all illustrated acts may be performed to implement the method 300 in accordance with the disclosed subject matter. In addition, those skilled in the art will understand and appreciate that the method 300 could alternatively be represented as a series of interrelated states via a state diagram or events.

Referring to FIG. 3A, at 302 the processing logic receives programming of a first type of event in a first ES control. In one embodiment, the event is a precise event. A precise event is a performance event that is linked to a specific instruction or micro-operation in an instruction trace and occurs when that instruction or micro-operation retires. The precise event may include, but is not limited to, instructions retired, branch instructions retired, cache references retired, and cache misses retired. In another embodiment, the event is a non-precise event. A non-precise event is a performance event that is either not linked to a specific instruction or micro-operation in an instruction trace or can occur speculatively even when the instruction or micro-operation does not retire. The non-precise event may include, but is not limited to, reference clockticks, core clockticks, and cycles. As discussed above, in one embodiment, the event is generated in the processor. In another embodiment, the event is generated outside the processor and the processing logic may detect the event by monitoring an interconnect fabric on which events may place alarm signals.

At block 304, the processing logic receives programming of a second type of event in a second ES control.

At block 306, a first performance counter corresponding to the first ES control is caused to track the programmed first type of event. For example, a value in the performance counter counting the first type of event may be incremented upon each occurrence of the first type of event. The first performance counter may be general purpose (GP) performance counter (can count more than one type of event) or a fixed counter (can count one type of event). The first performance counter may have a first starting value and a first limit. The first starting value may be zero, a negative number, a positive number, and so forth. The first limit may be a threshold value, may be a negative value, and so forth. The first performance counter may have a different limit for when the first performance counter reloads, causes a record, or causes an interrupt (e.g., reload occurs when the performance counter reaches limit−1, interrupt occurs when the performance counter reaches limit, a record is generated when the performance counter reaches limit+1, and so forth).

At block 308, a second performance counter corresponding to the second ES control is caused to track the programmed second type of event. The second performance counter may be a GP counter, a subset of a GP counter, or a fixed counter. The second performance counter may be the same type of counter (e.g., GP, subset of GP, fixed, and so forth) as the first performance counter or may be a different type of counter than the first performance counter. The second performance counter may have a second starting value and a second limit. The second starting value may be zero, a negative number, a positive number, and so forth. The second limit may be a threshold value, may be a negative value, and so forth. The second performance counter may also have a different limit for when the second performance counter reloads, causes a record, or causes an interrupt (e.g., reload occurs when the performance counter reaches limit−1, interrupt occurs when the performance counter reaches limit, a record is generated when the performance counter reaches limit+1, and so forth).

At block 310, it is determined whether the first performance counter overflowed. The first performance value may overflow when the first performance value reaches the first limit. When it is determined at block 310 that the first performance counter did overflow, then method 300 proceeds to block 312 where the first performance counter is reset to a first reload value (e.g., see layout 204 of FIG. 2C, reload enable bit 0 (RELOAD_EN0[0]) may cause performance counter 0 to be reloaded when performance counter 0 reaches the corresponding limit) and the second performance counter is reset to a second reload value (e.g., see layout 204 of FIG. 2C, reload enable bit 1 (RELOAD_EN0[1]) may cause performance counter 1 to be reloaded when performance counter 0 reaches the corresponding limit). The first reload value may be one or more of zero, the first starting value, a value between the first starting value and the first limit, and so forth. The second reload value may be one or more of zero, the second starting value, a value between the second starting value and the second limit, and so forth.

Figure 3B:
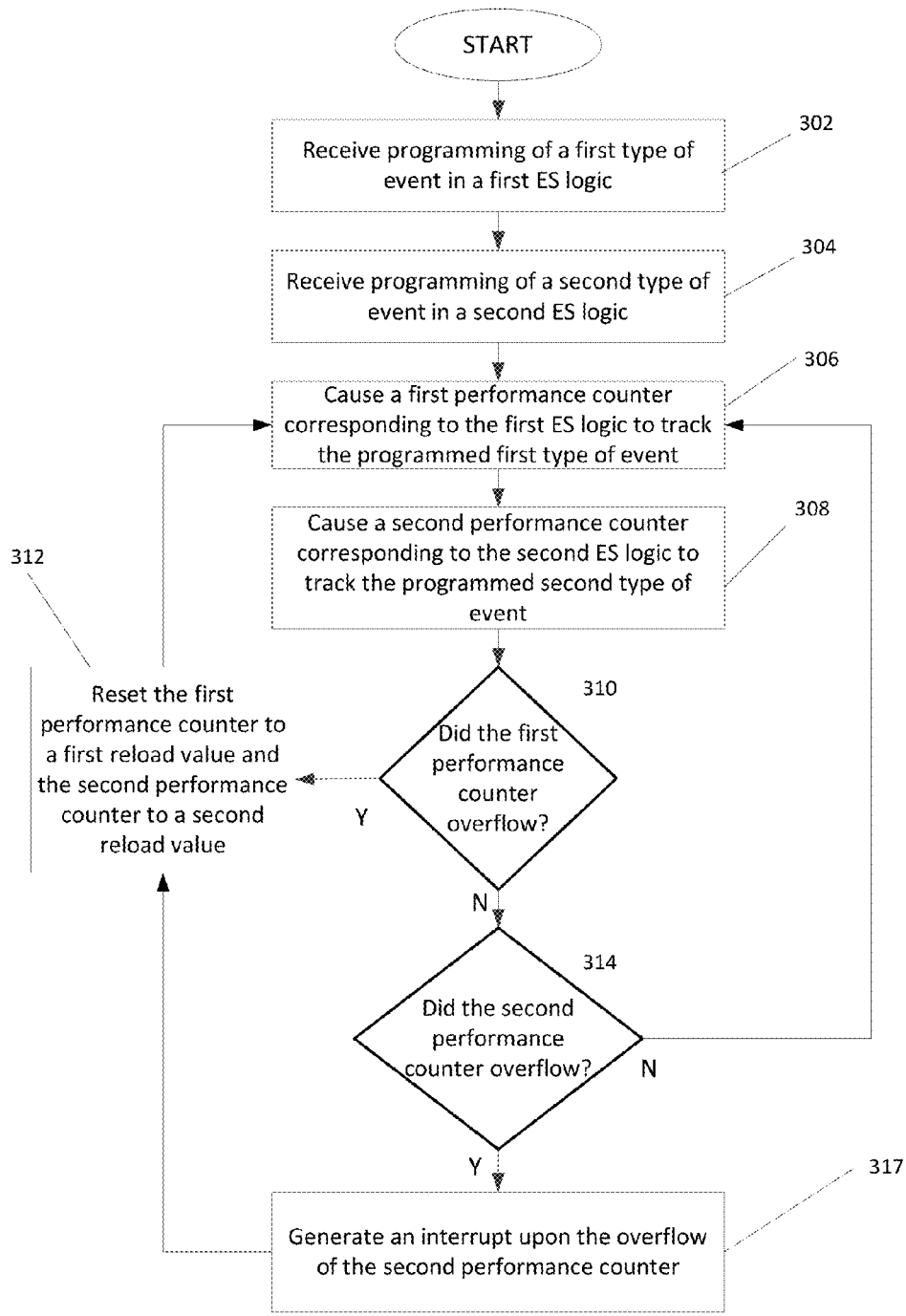
FIG. 3B is a flow diagram of a method for monitoring performance of a processor to manage events according to one embodiment of the disclosure.

Method 300 then returns to block 306 to continue tracking of the event occurrences. In FIGS. 3A-3B, the first performance counter may continuously track the first type of event throughout blocks 306-318 (or 306-317) and the second performance counter may continuously track the second type of event throughout blocks 308-318 (or 308-317) (e.g., even though the diagram shows different blocks and returning to block 306, the performance counters may continuously track event occurrences starting with the first occurrence of blocks 306 and 308). When it is determined at block 310 that the first performance counter did overflow, then method 300 proceeds to decision block 314.

At decision block 314, it is determined whether the second performance counter overflowed. The second performance value may overflow when the second performance value reaches the second limit. When it is determined at block 314 that the second performance counter did not overflow, then method 300 returns to block 306 to continue tracking of the event occurrences. When it is determined at block 314 that the second performance block did overflow, the method 300 proceeds to block 316. At block 316, an EBS record is generated upon the overflow of the second performance counter. In one embodiment, the EBS record is generated immediately upon occurrence of the overflow of the second performance counter (e.g., record generation after the limit is reached, record generation for non-precise event based sampling). In another embodiment, the EBS record is generated immediately after the occurrence of the overflow of the second performance counter (e.g., record generation when limit+1 is reached, record generation for precise event based sampling). In this embodiment, the EBS record is generated after the next instruction that retires, i.e. after completion of the instruction that triggered the performance counter to overflow.

The EBS record may include an architectural metadata of a state of the processor upon the overflow of the second performance counter. The architectural metadata may include, but is not limited, to an IP, a TSC, and register state, to name a few examples. As such, the architectural metadata of a processor associated with a second type of event may be quickly captured without utilizing a PMI.

At block 318, the generated EBS record for the second type of event is stored in a memory storage of the EBS handler. The method 300 then proceeds to block 312 where the first performance counter is reset to a first reload value (e.g., see layout 206 of FIG. 2C, reload enable bit 0 (RELOAD_EN1[0]) may cause performance counter 0 to be reloaded when performance counter 1 reaches the corresponding limit) and the second performance counter is reset to a second reload value (e.g., see layout 206 of FIG. 2C, reload enable bit 1 (RELOAD_EN1[1]) may cause performance counter 1 to be reloaded when performance counter 1 reaches the corresponding limit). The first and second reload values may be stored in a hardware register. Method 300 then returns to block 306 to continue tracking of the event occurrences.

In one embodiment, method 300 could have additional ES controls and additional performance counters. The processing logic may receive programming of three or more types of events in three or more corresponding ES controls. In one embodiment, each ES control may receive programming of a different type of event. In another embodiment, two or more ES controls may receive programming of the same type of event. When one of the plurality of performance counters overflows, one or more of the plurality of performance counters may be reset to a corresponding reload value. When at least one performance counter of a first subset of the plurality of performance counters overflows, a record may be generated and stored. When one or more of a second subset of performance counters overflows, a record may not be generated and stored.

FIG. 3B is a flow diagram of a method for monitoring performance of a processor to manage events according to another embodiment of the disclosure. Method 300 may be performed by processing logic that may include hardware (e.g., circuitry, dedicated logic, programmable logic, microcode, etc.), software (such as instructions run on a processor, a general purpose computer system, or a dedicated machine), firmware, microcode, or a combination thereof. In one embodiment, method 300 may be performed, in part, by processor 102 described above with respect to FIG. 1.

For simplicity of explanation, the method 300 is depicted and described as a series of acts. However, acts in accordance with this disclosure can occur in various orders and/or concurrently and with other acts not presented and described herein. Furthermore, not all illustrated acts may be performed to implement the method 300 in accordance with the disclosed subject matter. In addition, those skilled in the art will understand and appreciate that the method 300 could alternatively be represented as a series of interrelated states via a state diagram or events.

Referring to FIG. 3B, at 302, 304, 306, 308, 310, and 314 may be the same as or similar to FIG. 3A. At decision block 314, it is determined whether the second performance counter overflowed. The second performance value may overflow when the second performance value reaches the second limit. When it is determined at block 314 that the second performance counter did not overflow, then method 300 returns to block 306 to continue tracking of the event occurrences. When it is determined at block 314 that the second performance block did overflow, the method 300 proceeds to block 317. At block 317, an interrupt is generated upon the overflow of the second performance counter (e.g., upon overflow, upon overflow+1, generated immediately, delayed until end of the instruction, and so forth). The method 300 then proceeds to block 312 where the first performance counter is reset to a first reload value and the second performance counter is reset to a second reload value. The first and second reload values may be stored in a hardware register. Method 300 then returns to block 306 to repeat tracking of the event occurrences.

In one embodiment, method 300 could have additional ES controls and additional performance counters. The processing logic may receive programming of three or more types of events in three or more corresponding ES controls. In one embodiment, each ES control may receive programming of a different type of event. In another embodiment, two or more ES controls may receive programming of the same type of event. When one of the plurality of performance counters overflows, one or more of the plurality of performance counters may be reset to a corresponding reload value. When at least one performance counter of a first subset of the plurality of performance counters overflows, an interrupt may be generated. When one or more of a second subset of performance counters overflows, an interrupt may not be generated.

FIG. 3C is a block diagram illustrating architecture 370 that includes logic circuits to monitor performance in accordance with one embodiment of the invention.

The architecture 370 may include a plurality of performance counters 330 (e.g., first performance counter 330a, second performance counter 330b, and so forth). The performance counter 330 may be the same as performance counter 116 described with respect to FIG. 1. A first performance counter 330a may increment upon occurrence of a first type of event in the processor from a first starting value to a first limit. A second performance counter 330b may increment upon occurrence of a second type of event in the processor from a second starting value to a second limit.

The architecture 370 may include control logic 380. The control logic 380 may receive an indication of the first performance counter 330a reaching the first limit.

The architecture 370 may include one or more registers 385 (e.g., a software-visible register). One or more registers 385 may store software-visible control bits (e.g., a first reload enable bit, a second reload enable bit, and so forth). In response to receiving the indication of the first performance counter 330a reaching the first limit, the control logic 380 may access a first reload enable bit of the software-visible control bits in the one or more registers 385. The control logic 380 may send a control signal in view of the first reload enable bit.

The architecture 370 may include reload logic 390. The reload logic 390 may reset the second performance counter 330b to a second reload value in response to receiving the control signal from the control logic 380.

In one embodiment, in response to the control logic 380 receiving a second indication of the second performance counter 330b reaching the second limit, the control logic 380 may access a second reload enable bit of the software-visible control bits in the one or more registers 385 and the control logic 380 may send a second control signal in view of the second reload enable bit. The reload logic 390 may reset the first performance counter 330a to a first reload value in response to receiving the second control signal from the control logic 380.

In another embodiment, in response to the control logic 380 receiving the indication of the first performance counter 330a reaching the first limit, the control logic 380 may access a third reload enable bit of the software-visible control bits in the one or more registers 385 and send a third control signal in view of the third reload enable bit. The reload logic 390 may reset the first performance counter 330a to the first reload value in response to receiving the third control signal from the control logic 380. In response to the control logic 380 receiving the second indication of the second performance counter 330b reaching the second limit, the control logic 380 may access a fourth reload enable bit of the software-visible control bits in the one or more registers 385 and may send a fourth control signal in view of the fourth reload enable bit. The reload logic 390 may reset the second performance counter 330b to the second reload value in response to receiving the fourth control signal from the control logic 380.

In another embodiment, each performance counter 330 resets itself without accessing a reload enable bit in the one or more registers 385.

In one embodiment, one register 385 stores all of the reload enable bits. In another embodiment, the registers 385 may include a first software-visible register, a second software-visible register, and so forth.

In one embodiment, a first software-visible register may store reload enable bits that the control logic 380 accesses to send a plurality of control signals to rest other performance counters 330 when a first performance counter 330a reaches a first limit. For example, a first software-visible register may include a first plurality of control bits and the first software-visible register may correspond to the first performance counter 330a. The first plurality of control bits may include the first reload enable bit and a fifth reload enable bit. In response to receiving the indication of the first performance counter 330a reaching the first limit, the control logic 380 may access the first reload enable bit and may send a control signal in view of the first reload enable bit and the reload logic 390 may reset the second performance counter 330b to a second reload value in response to receiving the control signal from the control logic 380. In response to the control logic 380 receiving the indication of the first performance counter 330a reaching the first limit, the control logic 380 may access the fifth reload enable bit and send a fifth control signal in view of the fifth reload enable bit, and the reload logic 390 to reset a third performance counter to a third reload value in response to receiving the fifth control signal from the control logic 380.

In another embodiment, the first plurality of control bits may include a third reload enable bit. In response to the control logic 380 receiving the indication of the first performance counter 330a reaching the first limit, the control logic 380 may access the third reload enable bit and send a third control signal in view of the third reload enable bit and the reload logic 390 may reset the first performance counter 330a to the first reload value in response to receiving the third control signal from the control logic 380.

A second software-visible register may include a second plurality of control bits and the second software-visible register may correspond to the second performance counter. The second plurality of control bits may include the second reload enable bit and a sixth reload enable bit. In response to the control logic 380 receiving a second indication of the second performance counter 330b reaching the second limit, the control logic 380 may access a second reload enable bit of the software-visible control bits in the one or more registers 385 and the control logic 380 may send a second control signal in view of the second reload enable bit. The reload logic 390 may reset the first performance counter 330a to a first reload value in response to receiving the second control signal from the control logic 380. In response to the control logic 380 receiving the second indication, the control logic 380 may access the sixth reload enable bit of the software-visible control bits and send a sixth control signal in view of the sixth reload enable bit and the reload logic 390 may reset the third performance counter to the third reload value in response to receiving the sixth control signal from the control logic 380.

In another embodiment, the second plurality of control bits may include a fourth reload enable bit. In response to the control logic 380 receiving the second indication of the second performance counter 330b reaching the second limit, the control logic 380 may access a fourth reload enable bit of the software-visible control bits in the one or more registers 385 and may send a fourth control signal in view of the fourth reload enable bit. The reload logic 390 may reset the second performance counter 330b to the second reload value in response to receiving the fourth control signal from the control logic 380.

In another embodiment, a first software-visible register may store reload enable bits that the control logic 380 accesses to send a control signal to reset a first performance counter 330a when any one of a plurality of performance counters 330 reach their corresponding limits (e.g., one reload enable bit per performance counter 330).

Figure 3D:
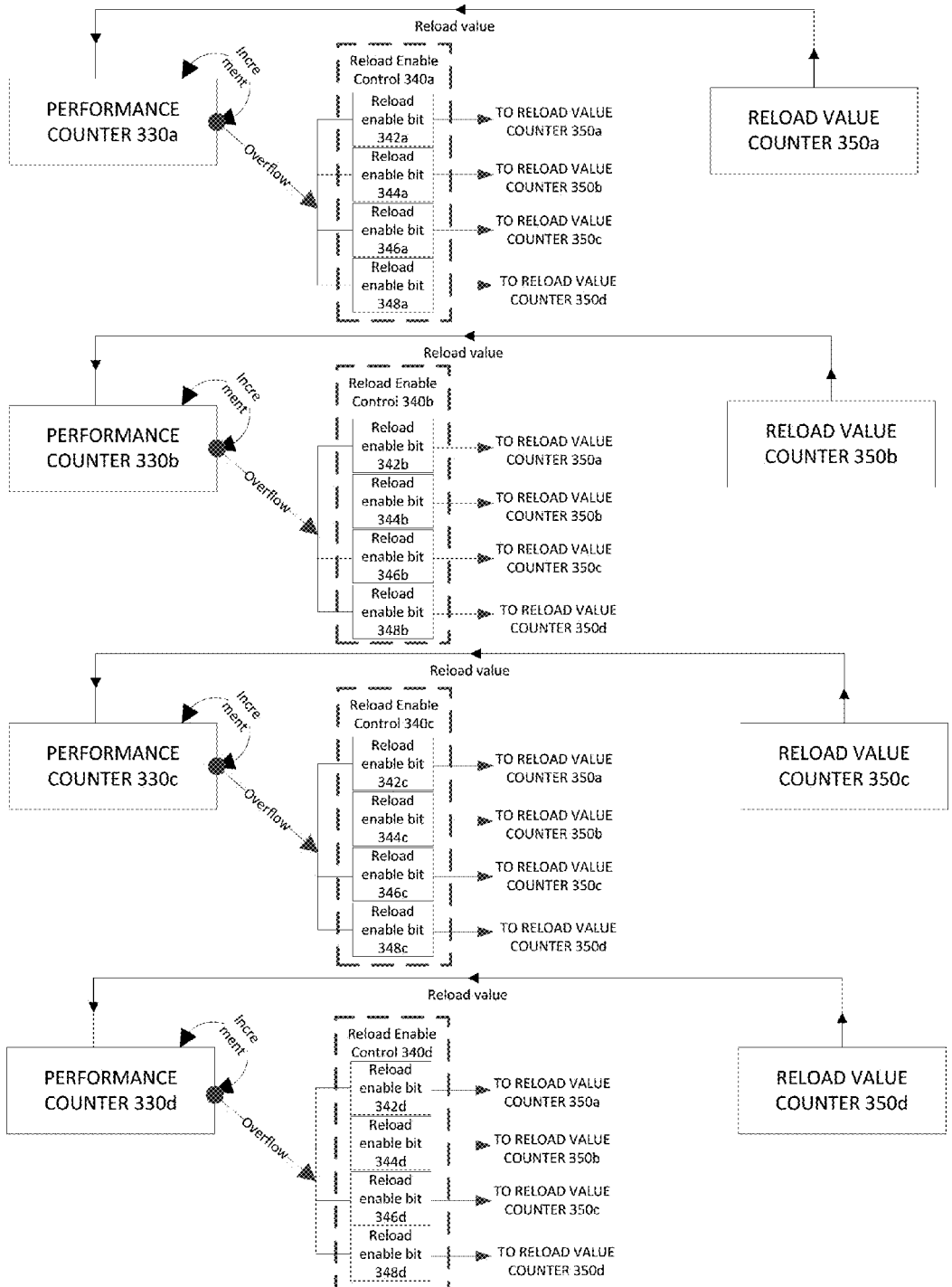
FIG. 3D is a block diagram illustrating architecture that includes logic circuits to monitor performance in accordance with one embodiment of the invention.

FIG. 3D is a block diagram illustrating architecture 320 that includes logic circuits to monitor performance in accordance with one embodiment of the invention. The architecture 320 may include performance counters 330a-d (hereinafter "performance counter 330"). The performance counter 330 may be the same as performance counter 116 described with respect to FIG. 1.

The architecture 320 may include reload enable controls 340a-d (hereinafter "reload enable control 340"). The reload enable control 340 may be the same as reload enable control 118 described with respect to FIG. 1. Each reload enable control 340 may correspond to a performance counter 330. For example, reload enable control 340a may correspond to performance counter 330a, reload enable control 340b may correspond to performance counter 330b, and so forth.

The architecture 320 may include reload value counters 350a-d (hereinafter "reload value counter 350"). The reload value counter 350 may indicate a reload value for the corresponding performance counter 330. The reload value may be one or more of the starting value, zero, a negative number, a predefined number, a user-specified number, and so forth. In one embodiment, each reload value may be different from each other. In another embodiment, each reload value may be the same. In one embodiment, the first reload value, the second reload value, and so forth may be stored in a hardware register. The hardware may be visible to software as a model specific register. By being stored in a hardware register, the reload values may be instantly reloaded to avoid having a performance counter 320 overflow and not initialize another performance counter 320 for an arbitrary number of samples. In another embodiment, the first reload value, second reload value, and so forth may be stored in memory, SRAM, or caches.

Table 2 illustrates an example of the reload value in an architectural MSR. The reload value (e.g., Counter X default value, and so forth) is copied into the performance counter (e.g., Counter X, and so forth) when so indicated by the reload enable control (e.g., Initialize Counter X, and so forth).

TABLE 2

| IA32_CounterX_DEFAULT | | |
| --- | --- | --- |
| MSB:0 | Counter X default value | This value is copied into Counter X when so indicated by the Initialize Counter X bit of an overflowing counter (see Table 1) |
| 63:48 | Reserved | Reserved 0. Fault/VMX failure on attempt to set to 1 |

In one embodiment, fewer bits could be supported. In one example, bits MSB (most significant bit):16 could be one (and enumerated through a new CPU identification (CPUID) leaf) and only bits 15:0 could be freely selected. This would allow the reload value to only allow a value between 0 and negative 2^16. This could reduce the cost of an implementation both in number of flops and in wiring needed to reload the performance counters.

The reload enable control 340 may hold a collection of bits that correspond to different reload value counters 350. In one embodiment, reload enable control 340 may hold all four reload enable control bits described in Table 1. In another embodiment, reload enable control 340a may hold reload enable bits 342a, 344a, 346a, and 348a. Each reload enable bit may correspond to a reload value counter 350. For example, reload enable bit 342a may correspond to reload value counter 350a, reload enable bit 344a may correspond to reload value counter 350b, and so forth.

The performance counter 330 may increment from a starting value to a limit. In one embodiment, the limit may be a predefined threshold value. In another embodiment, the limit may be a user specified threshold. The performance counter 330 may have a different limit for when the performance counter 330 reloads, causes a record, or causes an interrupt (e.g., reload occurs when the performance counter 330 reaches limit−1, interrupt occurs when the performance counter 330 reaches limit, a record is generated when the performance counter 330 reaches limit+1, and so forth).

In one embodiment, when the performance counter 330 reaches the limit, control logic may receive an indication of the performance counter 330 reaching the limit. In one embodiment, the indication may be that a threshold was reached. In another embodiment, the indication may be that a specific value was reached. In response to receiving an indication of a performance counter 330 reaching a limit, control logic may access a reload enable bit of reload enable control 340. The control logic may send a control signal in view of the reload enable bit and reload logic may receive the control signal sent by the control logic and the reload logic may reset a performance counter 330 with a reload value from the reload value counter 350. For example, in response to receiving the indication of the first performance counter 330a reaching the first limit, control logic may access a reload enable bit 344a of reload enable control 340a. The control logic may send a control signal in view of reload enable bit 344a. Reload logic may receive the control signal from the control logic and may reset the second performance counter 330b with a second reload value from reload value counter 350b. Upon being reset, the performance counter may continue incrementing from the reload value to the limit.

In another embodiment, when a performance counter reaches the corresponding limit, the performance counter 330 may be reset by control logic accessing a corresponding reload enable bit 342. For example, performance counter 330a may have a reload enable bit 342a that is accessed by control logic to send a control signal to be received by reload logic to reset the performance counter 330a with reload value counter 350a when performance counter 330a reaches the corresponding limit. In another embodiment, when a performance counter reaches the corresponding limit, the performance counter 330 may be reset without control logic accessing a corresponding reload enable bit 342.

Figure 4A:
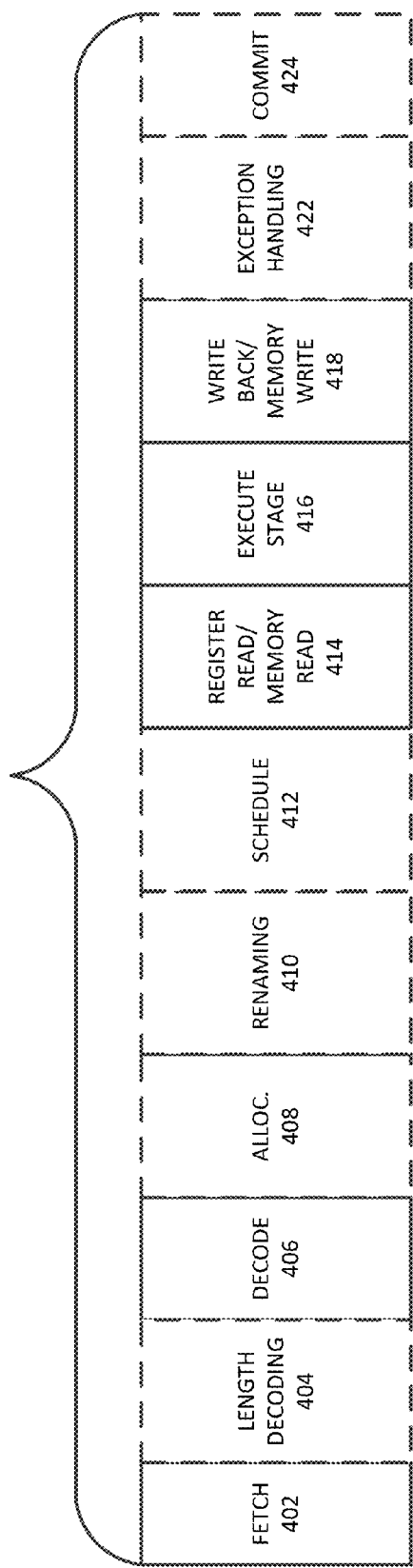
FIG. 4A is a block diagram illustrating an exemplary in order pipeline and an exemplary register renaming, out-of-order issue/execution pipeline in accordance with described embodiments.
Figure 4B:
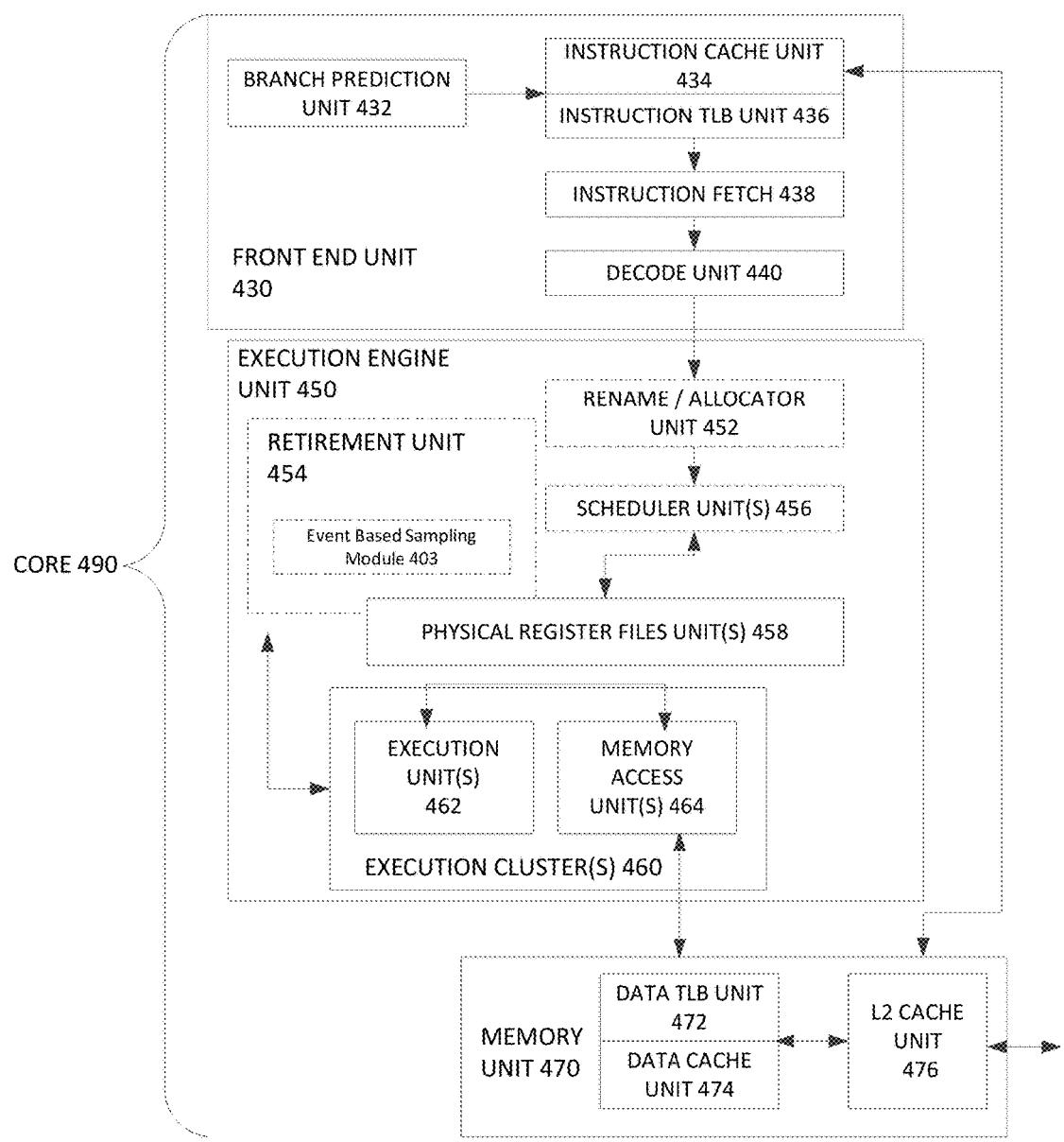
FIG. 4B is a block diagram illustrating both an exemplary embodiment of an in-order architecture core and an exemplary register renaming, out-of-order issue/execution architecture core to be included in a processor in accordance with described embodiments.

The EBS handler may be enabled via an EBS enable control to generate and store an EBS record when specific performance counters 330 reach their corresponding limits. For example, the EBS handler may not generate and store an EBS record when performance counter 330a reaches the corresponding limit, but EBS handler may generate and store an EBS record when one or more of performance counter 330b, 330c, or 330d reach their corresponding limits. FIG. 4A is a block diagram illustrating an in-order pipeline and a register re-naming stage, out-of-order issue/execution pipeline of a processor monitoring performance of a processing device to manage events according to at least one embodiment of the invention. FIG. 4B is a block diagram illustrating an in-order architecture core and a register renaming logic, out-of-order issue/execution logic to be included in a processor according to at least one embodiment of the invention. The solid lined boxes in FIG. 4A illustrate the in-order pipeline, while the dashed lined boxes illustrates the register renaming, out-of-order issue/execution pipeline. Similarly, the solid lined boxes in FIG. 4B illustrate the in-order architecture logic, while the dashed lined boxes illustrates the register renaming logic and out-of-order issue/execution logic.

In FIG. 4A, a processor pipeline 400 includes a fetch stage 402, a length decode stage 404, a decode stage 406, an allocation stage 408, a renaming stage 410, a scheduling (also known as a dispatch or issue) stage 412, a register read/memory read stage 414, an execute stage 416, a write back/memory write stage 418, an exception handling stage 422, and a commit stage 424. In some embodiments, the stages are provided in a different order and different stages may be considered in-order and out-of-order.

In FIG. 4B, arrows denote a coupling between two or more units and the direction of the arrow indicates a direction of data flow between those units. FIG. 4B shows processor core 490 including a front end unit 430 coupled to an execution engine unit 450, and both are coupled to a memory unit 70.

The core 490 may be a reduced instruction set computing (RISC) core, a complex instruction set computing (CISC) core, a very long instruction word (VLIW) core, or a hybrid or alternative core type. As yet another option, the core 490 may be a special-purpose core, such as, for example, a network or communication core, compression engine, graphics core, or the like.

The front end unit 430 includes a branch prediction unit 432 coupled to an instruction cache unit 434, which is coupled to an instruction translation lookaside buffer (TLB) 436, which is coupled to an instruction fetch unit 438, which is coupled to a decode unit 440. The decode unit or decoder may decode instructions, and generate as an output one or more micro-operations, micro-code entry points, microinstructions, other instructions, or other control signals, which are decoded from, or which otherwise reflect, or are derived from, the original instructions. The decoder may be implemented using various different mechanisms. Examples of suitable mechanisms include, but are not limited to, look-up tables, hardware implementations, programmable logic arrays (PLAs), microcode read only memories (ROMs), etc. The instruction cache unit 434 is further coupled to a level 2 (L2) cache unit 476 in the memory unit 470. The decode unit 440 is coupled to a rename/allocator unit 452 in the execution engine unit 450.

The execution engine unit 450 includes the rename/allocator unit 452 coupled to a retirement unit 454 and a set of one or more scheduler unit(s) 456. The retirement unit 454 may include an event based sampling (EBS) module 403 to monitor performance of a processing device to manage events according to embodiments of the invention. The scheduler unit(s) 456 represents any number of different schedulers, including reservations stations, central instruction window, etc. The scheduler unit(s) 456 is coupled to the physical register file(s) unit(s) 458. Each of the physical register file(s) units 458 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc. The physical register file(s) unit(s) 458 is overlapped by the retirement unit 454 to illustrate various ways in which register renaming and out-of-order execution may be implemented (e.g., using a reorder buffer(s) and a retirement register file(s), using a future file(s), a history buffer(s), and a retirement register file(s); using a register maps and a pool of registers; etc.).

Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register renaming, combinations of dedicated and dynamically allocated physical registers, etc. The retirement unit 454 and the physical register file(s) unit(s) 458 are coupled to the execution cluster(s) 460. The execution cluster(s) 460 includes a set of one or more execution units 462 and a set of one or more memory access units 464. The execution units 462 may perform various operations (e.g., shifts, addition, subtraction, multiplication) and on various types of data (e.g., scalar floating point, packed integer, packed floating point, vector integer, vector floating point).

While some embodiments may include a number of execution units dedicated to specific functions or sets of functions, other embodiments may include one execution unit or multiple execution units that all perform all functions. The scheduler unit(s) 456, physical register file(s) unit(s) 458, and execution cluster(s) 460 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which the execution cluster of this pipeline has the memory access unit(s) 464). It should also be understood that where separate pipelines are used, one or more of these pipelines may be out-of-order issue/execution and the rest in-order.

The set of memory access units 464 is coupled to the memory unit 470, which includes a data TLB unit 472 coupled to a data cache unit 474 coupled to a level 2 (L2) cache unit 476. In one exemplary embodiment, the memory access units 464 may include a load unit, a store address unit, and a store data unit, each of which is coupled to the data TLB unit 472 in the memory unit 470. The L2 cache unit 476 is coupled to one or more other levels of cache and eventually to a main memory.

By way of example, the exemplary register renaming, out-of-order issue/execution core architecture may implement the pipeline 400 as follows: 1) the instruction fetch 38 performs the fetch and length decoding stages 402 and 404; 2) the decode unit 440 performs the decode stage 406; 3) the rename/allocator unit 452 performs the allocation stage 408 and renaming stage 410; 4) the scheduler unit(s) 456 performs the schedule stage 412; 5) the physical register file(s) unit(s) 458 and the memory unit 470 perform the register read/memory read stage 414; the execution cluster 460 perform the execute stage 416; 6) the memory unit 470 and the physical register file(s) unit(s) 458 perform the write back/memory write stage 418; 7) various units may be involved in the exception handling stage 422; and 8) the retirement unit 454 and the physical register file(s) unit(s) 458 perform the commit stage 424.

The core 490 may support one or more instructions sets (e.g., the x86 instruction set (with some extensions that have been added with newer versions); the MIPS instruction set of MIPS Technologies of Sunnyvale, Calif.; the ARM instruction set (with additional extensions such as NEON) of ARM Holdings of Sunnyvale, Calif.).

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in-order architecture. While the illustrated embodiment of the processor also includes a separate instruction and data cache units 434/474 and a shared L2 cache unit 476, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 5:
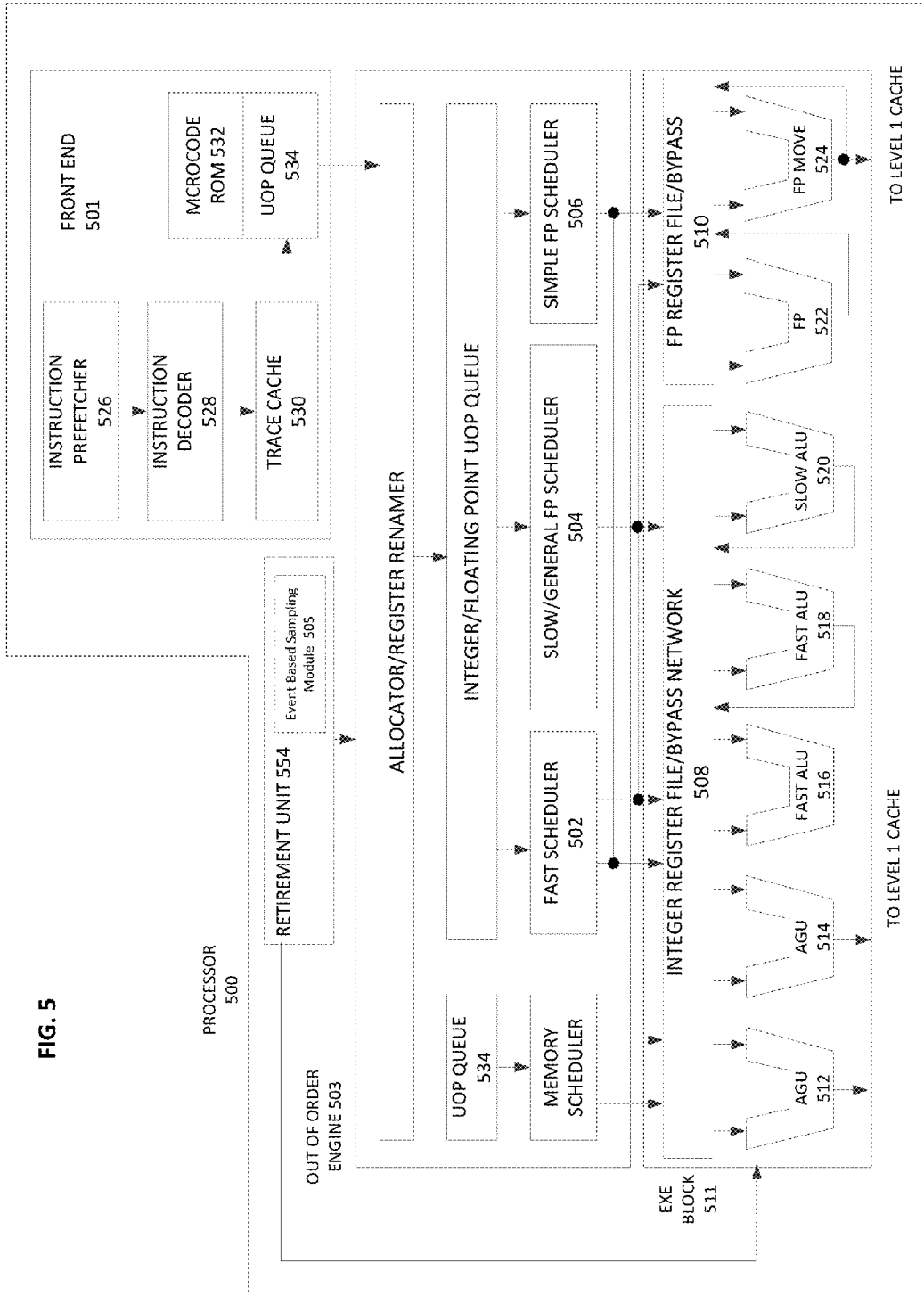
FIG. 5 is a block diagram illustrating a processor according to one embodiment.

FIG. 5 is a block diagram illustrating a micro-architecture for a processor 500 that includes logic circuits to perform instructions in accordance with one embodiment of the invention. In one embodiment, processor 500 monitors performance of a processing device to manage events. In some embodiments, an instruction in accordance with one embodiment can be implemented to operate on data elements having sizes of byte, word, doubleword, quadword, etc., as well as datatypes, such as single and double precision integer and floating point datatypes. In one embodiment the in-order front end 501 is the part of the processor 500 that fetches instructions to be executed and prepares them to be used later in the processor pipeline. The front end 501 may include several units. In one embodiment, the instruction prefetcher 526 fetches instructions from memory and feeds them to an instruction decoder 528, which in turn decodes or interprets them. For example, in one embodiment, the decoder decodes a received instruction into one or more operations called "micro-instructions" or "micro-operations" (also called micro op or uops) that the machine can execute.

In other embodiments, the decoder parses the instruction into an opcode and corresponding data and control fields that are used by the micro-architecture to perform operations in accordance with one embodiment. In one embodiment, the trace cache 530 takes decoded uops and assembles them into program ordered sequences or traces in the uop queue 534 for execution. When the trace cache 530 encounters a complex instruction, the microcode ROM 532 provides the uops needed to complete the operation.

Some instructions are converted into a single micro-op, whereas others use several micro-ops to complete the full operation. In one embodiment, if more than four micro-ops are needed to complete an instruction, the decoder 528 accesses the microcode ROM 532 to do the instruction. For one embodiment, an instruction can be decoded into a small number of micro ops for processing at the instruction decoder 528. In another embodiment, an instruction can be stored within the microcode ROM 532 should a number of micro-ops be needed to accomplish the operation. The trace cache 530 refers to an entry point programmable logic array (PLA) to determine a correct micro-instruction pointer for reading the micro-code sequences to complete one or more instructions in accordance with one embodiment from the micro-code ROM 532. After the microcode ROM 532 finishes sequencing micro-ops for an instruction, the front end 501 of the machine resumes fetching micro-ops from the trace cache 530.

The out-of-order execution engine 503 is where the instructions are prepared for execution. The out-of-order execution logic has a number of buffers to smooth out and re-order the flow of instructions to optimize performance as they go down the pipeline and get scheduled for execution. The allocator logic allocates the machine buffers and resources that each uop needs in order to execute. The register renaming logic renames logic registers onto entries in a register file. The allocator also allocates an entry for each uop in one of the two uop queues, one for memory operations and one for non-memory operations, in front of the instruction schedulers: memory scheduler, fast scheduler 502, slow/general floating point scheduler 504, and simple floating point scheduler 506. The uop schedulers 502, 504, 506 determine when a uop is ready to execute based on the readiness of their dependent input register operand sources and the availability of the execution resources the uops use to complete their operation. The fast scheduler 502 of one embodiment can schedule on each half of the main clock cycle while the other schedulers can schedule once per main processor clock cycle. The schedulers arbitrate for the dispatch ports to schedule uops for execution.

Register files 508, 510 sit between the schedulers 502, 504, 506, and the execution units 512, 514, 516, 518, 520, 522, 524 in the execution block 511. There is a separate register file for integer and floating point operations, respectively. Each register file 508, 510, of one embodiment also includes a bypass network that can bypass or forward just completed results that have not yet been written into the register file to new dependent uops. The integer register file 508 and the floating point register file 510 are also capable of communicating data with the other. For one embodiment, the integer register file 508 is split into two separate register files, one register file for the low order 32 bits of data and a second register file for the high order 32 bits of data. The floating point register file 510 of one embodiment has 128 bit wide entries because floating point instructions typically have operands from 66 to 128 bits in width.

The execution block 511 contains the execution units 512, 514, 516, 518, 520, 522, 524, where the instructions are actually executed. This section includes the register files 508, 510, that store the integer and floating point data operand values that the micro-instructions use to execute. The processor 500 of one embodiment is comprised of a number of execution units: address generation unit (AGU) 512, AGU 514, fast ALU 516, fast ALU 518, slow ALU 520, floating point ALU 522, floating point move unit 524. For one embodiment, the floating point execution blocks 522, 524, execute floating point, MMX, SIMD, and SSE, or other operations. The floating point ALU 522 of one embodiment includes a 64 bit by 54 bit floating point divider to execute divide, square root, and remainder micro-ops. For embodiments of the invention, instructions involving a floating point value may be handled with the floating point hardware.

In one embodiment, the ALU operations go to the high-speed ALU execution units 516, 518. The fast ALUs 516, 518, of one embodiment can execute fast operations with an effective latency of half a clock cycle. For one embodiment, most complex integer operations go to the slow ALU 520 as the slow ALU 520 includes integer execution hardware for long latency type of operations, such as a multiplier, shifts, flag logic, and branch processing. Memory load/store operations are executed by the AGUs 512, 514. For one embodiment, the integer ALUs 516, 518, 520 are described in the context of performing integer operations on 64 bit data operands. In alternative embodiments, the ALUs 516, 518, 520 can be implemented to support a variety of data bits including 16, 32, 128, 256, etc. Similarly, the floating point units 522, 524 can be implemented to support a range of operands having bits of various widths. For one embodiment, the floating point units 522, 524 can operate on 128 bits wide packed data operands in conjunction with SIMD and multimedia instructions.

In one embodiment, the uops schedulers 502, 504, 506 dispatch dependent operations before the parent load has finished executing. As uops are speculatively scheduled and executed in processor 500, the processor 500 also includes logic to handle memory misses. If a data load misses in the data cache, there can be dependent operations in flight in the pipeline that have left the scheduler with temporarily incorrect data. A replay mechanism tracks and re-executes instructions that use incorrect data. The dependent operations should be replayed and the independent ones are allowed to complete. The schedulers and replay mechanism of one embodiment of a processor are also designed to catch instruction sequences for text string comparison operations.

The processor 500 may include a retirement unit 554 coupled to the execution block 511. The retirement unit 554 may include an EBS module 505 to monitor performance of a processing device to manage events according to embodiments of the invention.

The term "registers" may refer to the on-board processor storage locations that are used as part of instructions to identify operands. In other words, registers may be those that are usable from the outside of the processor (from a programmer's perspective). However, the registers of an embodiment should not be limited in meaning to a particular type of circuit. Rather, a register of an embodiment is capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one embodiment, integer registers store thirty-two bit integer data.

A register file of one embodiment also contains eight multimedia SIMD registers for packed data. For the discussions below, the registers are understood to be data registers designed to hold packed data, such as 64 bits wide MMX registers (also referred to as 'mm' registers in some instances) in microprocessors enabled with the MMX™ technology from Intel® Corporation of Santa Clara, Calif. These MMX registers, available in both integer and floating point forms, can operate with packed data elements that accompany SIMD and SSE instructions. Similarly, 128 bits wide XMM registers relating to SSE2, SSE3, SSE4, or beyond (referred to generically as "SSEx") technology can also be used to hold such packed data operands. In one embodiment, in storing packed data and integer data, the registers do not differentiate between the two data types. In one embodiment, integer and floating point are contained in either the same register file or different register files. Furthermore, in one embodiment, floating point and integer data may be stored in different registers or the same registers.

Figure 6:
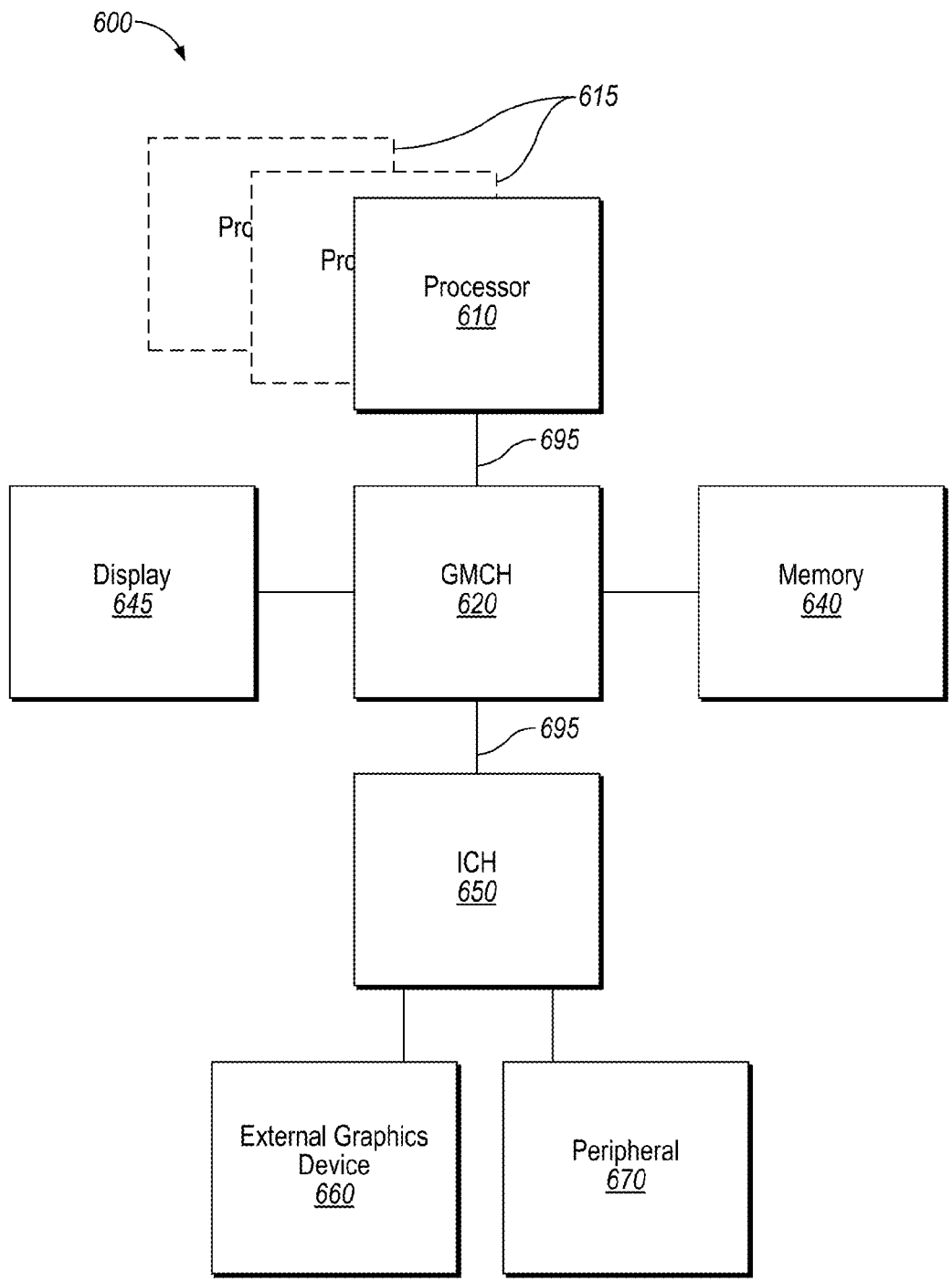
FIG. 6 illustrates a block diagram of a computer system according to one embodiment.

Referring now to FIG. 6, shown is a block diagram of a system 600 in accordance with one embodiment of the invention. The system 600 may include one or more processors 610, 615, which are coupled to graphics memory controller hub (GMCH) 620. The optional nature of additional processors 615 is denoted in FIG. 6 with broken lines. In one embodiment, a processor 610, 615 monitors performance of a processing device to manage events.

Each processor 610, 615 may be some version of the circuit, integrated circuit, processor, and/or silicon integrated circuit as described above. However, it should be noted that it is unlikely that integrated graphics logic and integrated memory control units would exist in the processors 610, 615. FIG. 6 illustrates that the GMCH 620 may be coupled to a memory 640 that may be, for example, a dynamic random access memory (DRAM). The DRAM may, for at least one embodiment, be associated with a non-volatile cache.

The GMCH 620 may be a chipset, or a portion of a chipset. The GMCH 620 may communicate with the processor(s) 610, 615 and control interaction between the processor(s) 610, 615 and memory 640. The GMCH 620 may also act as an accelerated bus interface between the processor(s) 610, 615 and other elements of the system 600. For at least one embodiment, the GMCH 620 communicates with the processor(s) 610, 615 via a multi-drop bus, such as a frontside bus (FSB) 695.

Furthermore, GMCH 620 is coupled to a display 645 (such as a flat panel or touchscreen display). GMCH 620 may include an integrated graphics accelerator. GMCH 620 is further coupled to an input/output (I/O) controller hub (ICH) 650, which may be used to couple various peripheral devices to system 600. Shown for example in the embodiment of FIG. 6 is an external graphics device 660, which may be a discrete graphics device coupled to ICH 650, along with another peripheral device 670.

Alternatively, additional or different processors may also be present in the system 600. For example, additional processor(s) 615 may include additional processors(s) that are the same as processor 610, additional processor(s) that are heterogeneous or asymmetric to processor 610, accelerators (such as, e.g., graphics accelerators or digital signal processing (DSP) units), field programmable gate arrays, or any other processor. There can be a variety of differences between the processor(s) 610, 615 in terms of a spectrum of metrics of merit including architectural, micro-architectural thermal, power consumption characteristics, and the like. These differences may effectively manifest themselves as asymmetry and heterogeneity amongst the processors 610, 615. For at least one embodiment, the various processors 610, 615 may reside in the same die package.

Figure 7:
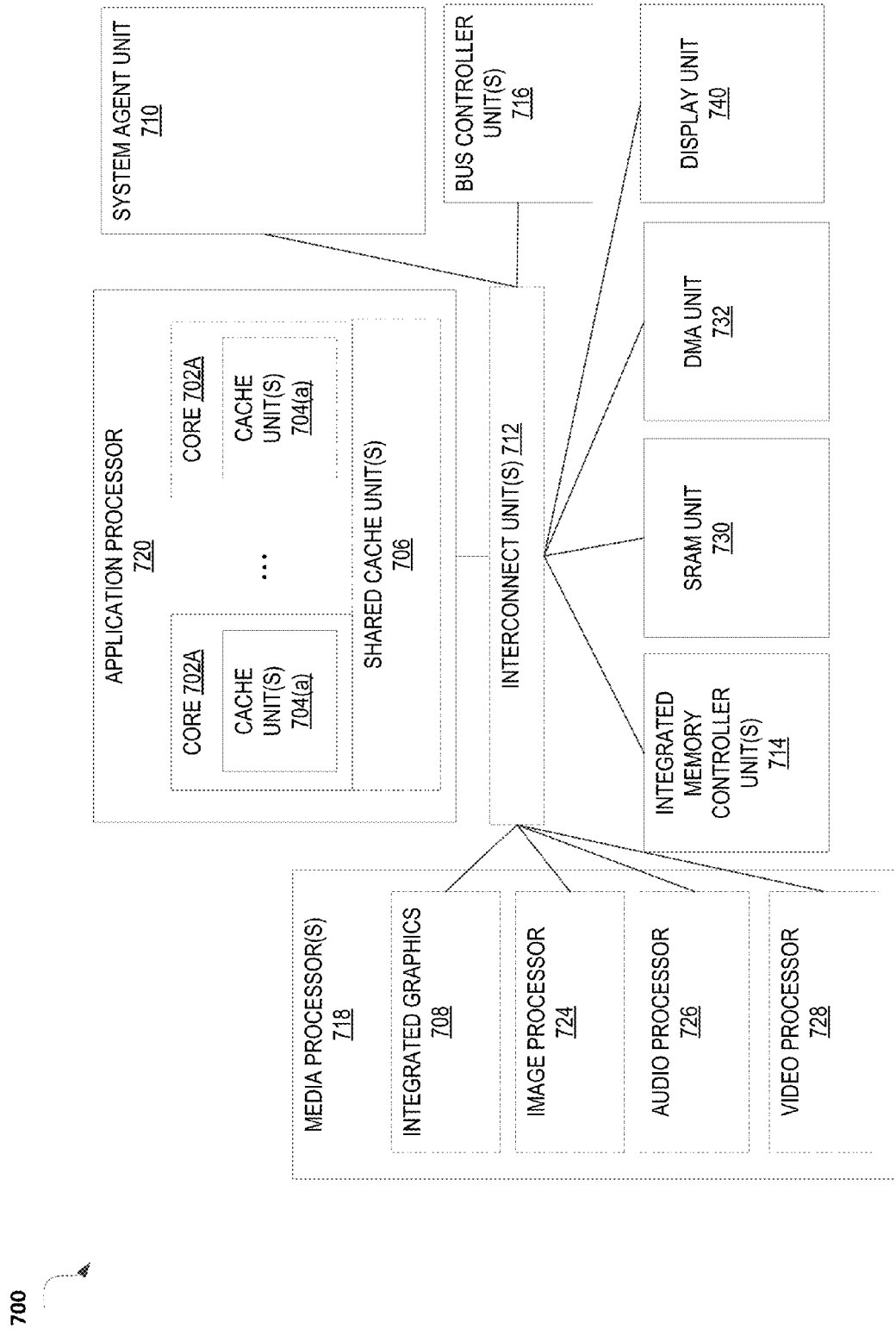
FIG. 7 is a block diagram of a system on chip (SoC) in accordance with an embodiment of the present disclosure.

Embodiments may be implemented in many different system types. FIG. 7 is a block diagram of a SoC 700 in accordance with an embodiment of the present disclosure. Dashed lined boxes are optional features on more advanced SoCs. In FIG. 7, an interconnect unit(s) 712 is coupled to: an application processor 720 which includes a set of one or more cores 702A-N and shared cache unit(s) 706; a system agent unit 710; a bus controller unit(s) 716; an integrated memory controller unit(s) 714; a set or one or more media processors 718 which may include integrated graphics logic 708, an image processor 724 for providing still and/or video camera functionality, an audio processor 726 for providing hardware audio acceleration, and a video processor 728 for providing video encode/decode acceleration; a static random access memory (SRAM) unit 730; a direct memory access (DMA) unit 732; and a display unit 740 for coupling to one or more external displays. In one embodiment, a memory module may be included in the integrated memory controller unit(s) 714. In another embodiment, the memory module may be included in one or more other components of the SoC 700 that may be used to access and/or control a memory. The application processor 720 may include a conditional branch, indirect branch and event execution logics as described in embodiments herein.

The memory hierarchy includes one or more levels of cache within the cores, a set or one or more shared cache units 706, and external memory (not shown) coupled to the set of integrated memory controller units 714. The set of shared cache units 706 may include one or more mid-level caches, such as level 2 (L2), level 3 (L3), level 4 (L4), or other levels of cache, a last level cache (LLC), and/or combinations thereof.

In some embodiments, one or more of the cores 702A-N are capable of multi-threading.

The system agent 710 includes those components coordinating and operating cores 702A-N. The system agent unit 710 may include for example a power control unit (PCU) and a display unit. The PCU may be or include logic and components needed for regulating the power state of the cores 702A-N and the integrated graphics logic 708. The display unit is for driving one or more externally connected displays.

The cores 702A-N may be homogenous or heterogeneous in terms of architecture and/or instruction set. For example, some of the cores 702A-N may be in order while others are out-of-order. As another example, two or more of the cores 702A-N may be capable of executing the same instruction set, while others may be capable of executing only a subset of that instruction set or a different instruction set.

The application processor 720 may be a general-purpose processor, such as a Core™ i3, i5, i7, 2 Duo and Quad, Xeon™, Itanium™, Atom™, XScale® or StrongARM™ processor, which are available from Intel® Corporation, of Santa Clara, Calif. Alternatively, the application processor 720 may be from another company, such as ARM Holdings™, Ltd, MIPS™, etc. The application processor 720 may be a special-purpose processor, such as, for example, a network or communication processor, compression engine, graphics processor, co-processor, embedded processor, or the like. The application processor 720 may be implemented on one or more chips. The application processor 720 may be a part of and/or may be implemented on one or more substrates using any of a number of process technologies, such as, for example, BiCMOS, CMOS, or NMOS.

In another embodiment, the SoC may include a plurality of processors, a memory device, one or more registers to store software-visible control bits, one or more hardware registers to store a first reload value and a second reload value, a first performance counter, a second performance counter, control logic, and reload logic. The first performance counter may increment upon occurrence of a first type of event in a processor of the plurality of processors from a first starting value to a first limit. The second performance counter may increment upon occurrence of a second type of event in the processor from a second starting value to a second limit. The control logic may receive an indication of the first performance counter reaching the first limit, access a reload enable bit of the software-visible control bits, and send a control signal in view of the reload enable bit. The reload logic may reset the second performance counter to the second reload value in response to receiving the control signal from the control logic.

In response to the control logic receiving a second indication of the second performance counter reaching the second limit, the control logic may access a second reload enable bit of the software-visible control bits and send a second control signal in view of the second reload enable bit and the reload logic may reset the first performance counter to a first reload value in response to receiving the second control signal from the control logic.

In one embodiment, the SoC may also include an EBS component to generate a record in response to the second performance counter reaching the second limit, wherein the EBS record comprises architectural metadata defining a state of the processor at a time of generation of the EBS record. In another embodiment, the SoC may also include an interrupt component to generate an interrupt in response to the second performance counter reaching the second limit. The SoC may also include a first event select (ES) control programmed with a first identifier of the first type of event, where the first performance counter is enabled via the first ES control to increment upon occurrence of the first type of event. A second ES control may be programmed with a second identifier of the second type of event, wherein the second performance counter is enabled via the second ES control to increment upon occurrence of the second type of event.

Figure 8:
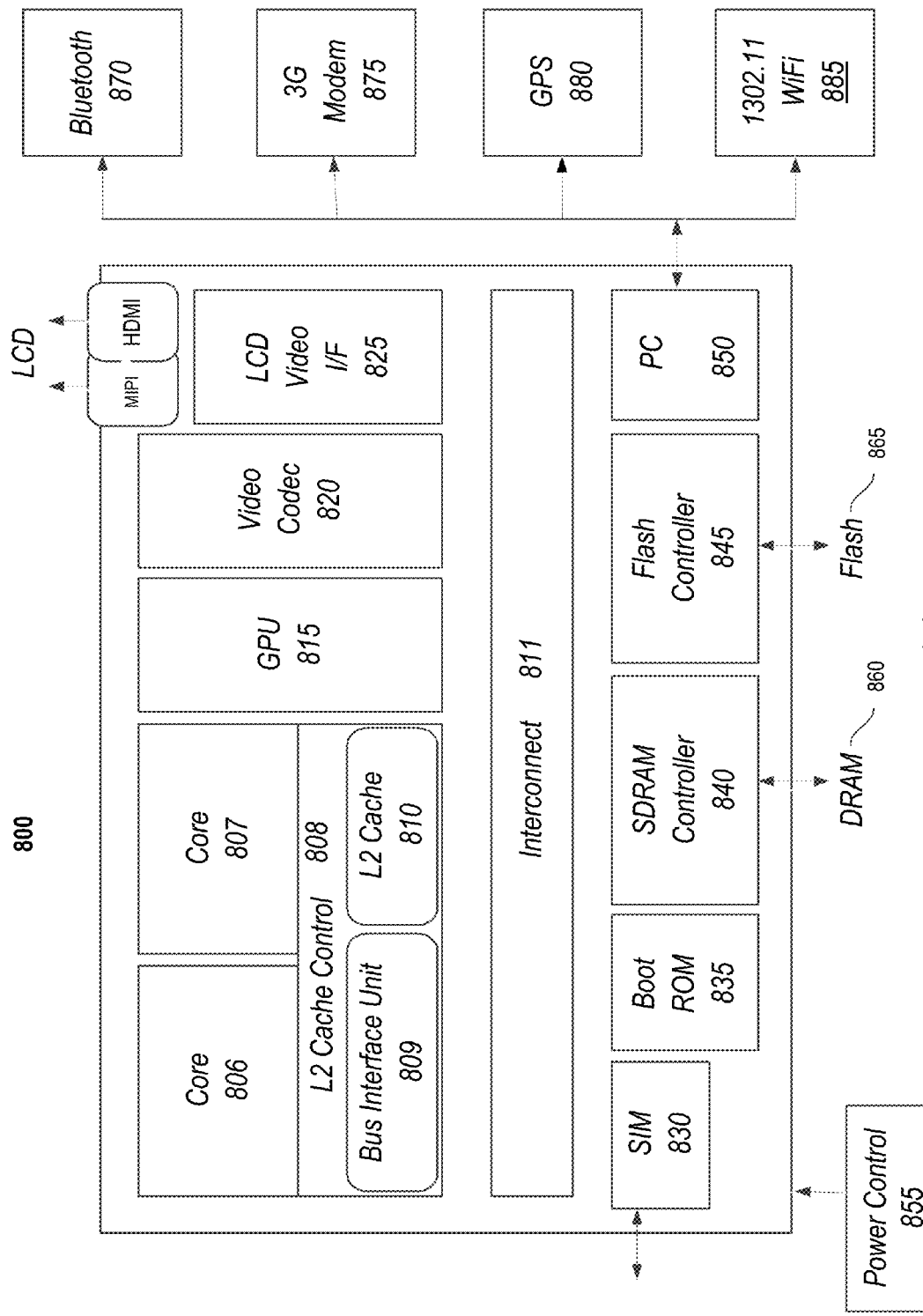
FIG. 8 is a block diagram of an embodiment of a system on-chip (SOC) design.

FIG. 8 is a block diagram of an embodiment of a system on-chip (SoC) design in accordance with the present disclosure. As a specific illustrative example, SoC 800 is included in user equipment (UE). In one embodiment, UE refers to any device to be used by an end-user to communicate, such as a hand-held phone, smartphone, tablet, ultra-thin notebook, notebook with broadband adapter, or any other similar communication device. Often a UE connects to a base station or node, which potentially corresponds in nature to a mobile station (MS) in a GSM network.

Here, SOC 800 includes 2 cores—806 and 807. Cores 806 and 807 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 806 and 807 are coupled to cache control 808 that is associated with bus interface unit 809 and L2 cache 810 to communicate with other parts of system 800. Interconnect 811 includes an on-chip interconnect, such as an IOSF, AMBA, or other interconnect discussed above, which potentially implements one or more aspects of the described disclosure. In one embodiment, a conditional branch, indirect branch and event execution logics may be included in cores 806 and 807.

Interconnect 811 provides communication channels to the other components, such as a Subscriber Identity Module (SIM) 830 to interface with a SIM card, a boot ROM 835 to hold boot code for execution by cores 806 and 807 to initialize and boot SoC 800, a SDRAM controller 840 to interface with external memory (e.g. DRAM 860), a flash controller 845 to interface with non-volatile memory (e.g. Flash 865), a peripheral control 850 (e.g. Serial Peripheral Interface) to interface with peripherals, video codecs 820 and Video interface 825 to display and receive input (e.g. touch enabled input), GPU 815 to perform graphics related computations, etc. Any of these interfaces may incorporate aspects of the disclosure described herein. In addition, the system 800 illustrates peripherals for communication, such as a Bluetooth module 870, 3G modem 875, GPS 880, and Wi-Fi 885. In addition, the system 800 illustrates a power control 855.

Figure 9:
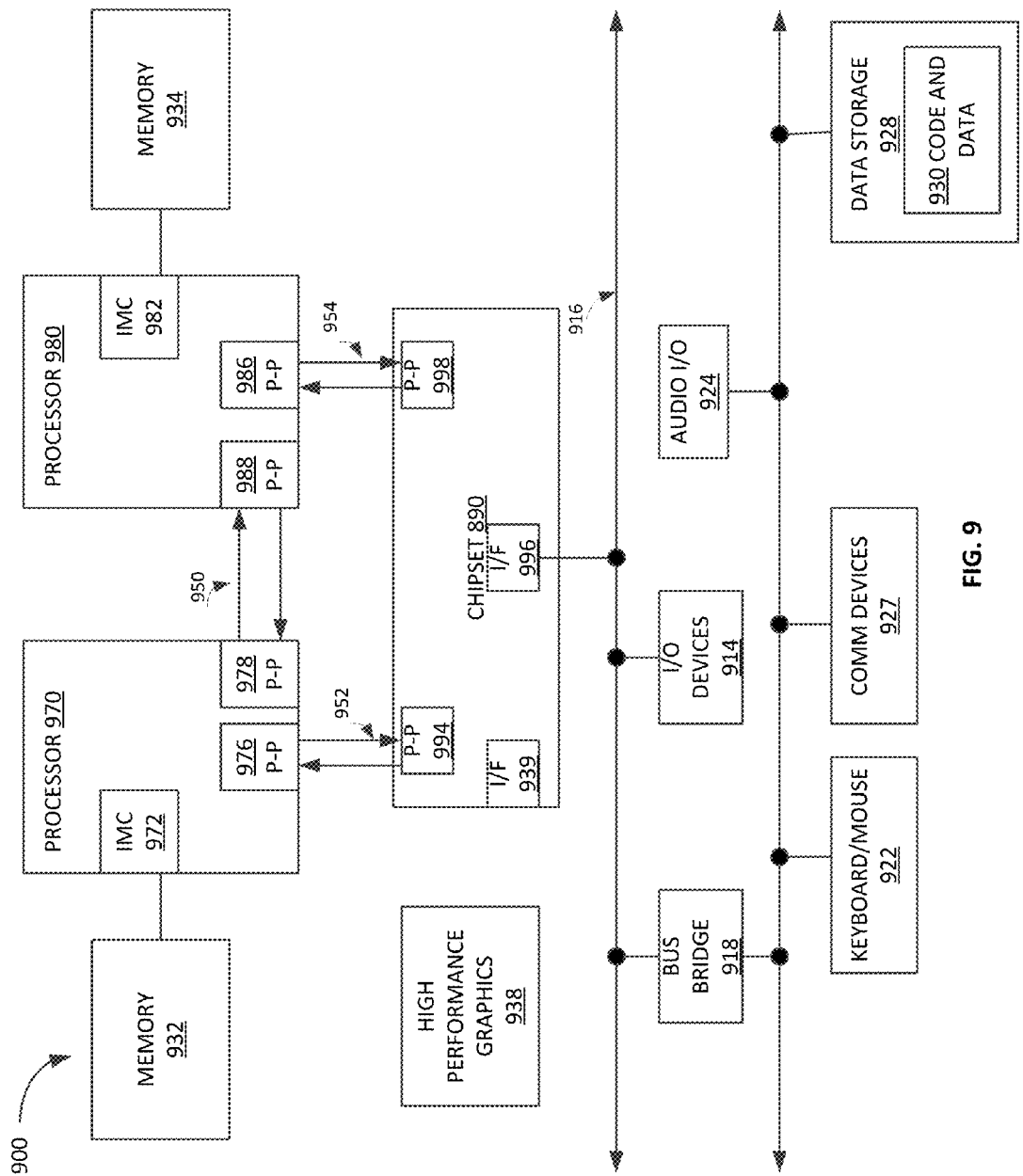
FIG. 9 illustrates a block diagram of a computer system according to one embodiment.

Referring now to FIG. 9, shown is a block diagram of a system 900 in accordance with an embodiment of the invention. As shown in FIG. 9, multiprocessor system 900 is a point-to-point interconnect system, and includes a first processor 970 and a second processor 980 coupled via a point-to-point interconnect 950. Each of processors 970 and 980 may be some version of the processors of the computing systems as described herein. In one embodiment, processors 970, 980 monitoring performance of a processing device to manage events to monitor performance of a processing device to manage events.

While shown with two processors 970, 980, it is to be understood that the scope of the disclosure is not so limited. In other embodiments, one or more additional processors may be present in a given processor.

Processors 970 and 980 are shown including integrated memory controller units 972 and 982, respectively. Processor 970 also includes as part of its bus controller units point-to-point (P-P) interfaces 976 and 978; similarly, second processor 980 includes P-P interfaces 986 and 988. Processors 970, 980 may exchange information via a point-to-point (P-P) interface 950 using P-P interface circuits 978, 988. As shown in FIG. 9, IMCs 972 and 982 couple the processors to respective memories, namely a memory 932 and a memory 934, which may be portions of main memory locally attached to the respective processors.

Processors 970 and 980 may each exchange information with a chipset 990 via individual P-P interfaces 952, 954 using point to point interface circuits 976, 994, 986, 998. Chipset 990 may also exchange information with a high-performance graphics circuit 938 via a high-performance graphics interface 939.

A shared cache (not shown) may be included in either processor or outside of both processors, yet connected with the processors via P-P interconnect, such that either or both processors' local cache information may be stored in the shared cache if a processor is placed into a low power mode.

Chipset 990 may be coupled to a first bus 916 via an interface 996. In one embodiment, first bus 916 may be a Peripheral Component Interconnect (PCI) bus, or a bus such as a PCI Express bus or another third generation I/O interconnect bus, although the scope of the disclosure is not so limited.

As shown in FIG. 9, various I/O devices 914 may be coupled to first bus 916, along with a bus bridge 918, which couples first bus 916 to a second bus 920. In one embodiment, second bus 920 may be a low pin count (LPC) bus. Various devices may be coupled to second bus 920 including, for example, a keyboard and/or mouse 922, communication devices 927 and a storage unit 928 such as a disk drive or other mass storage device which may include instructions/code and data 930, in one embodiment. Further, an audio I/O 924 may be coupled to second bus 920. Note that other architectures are possible. For example, instead of the point-to-point architecture of FIG. 9, a system may implement a multi-drop bus or other such architecture.

Figure 10:
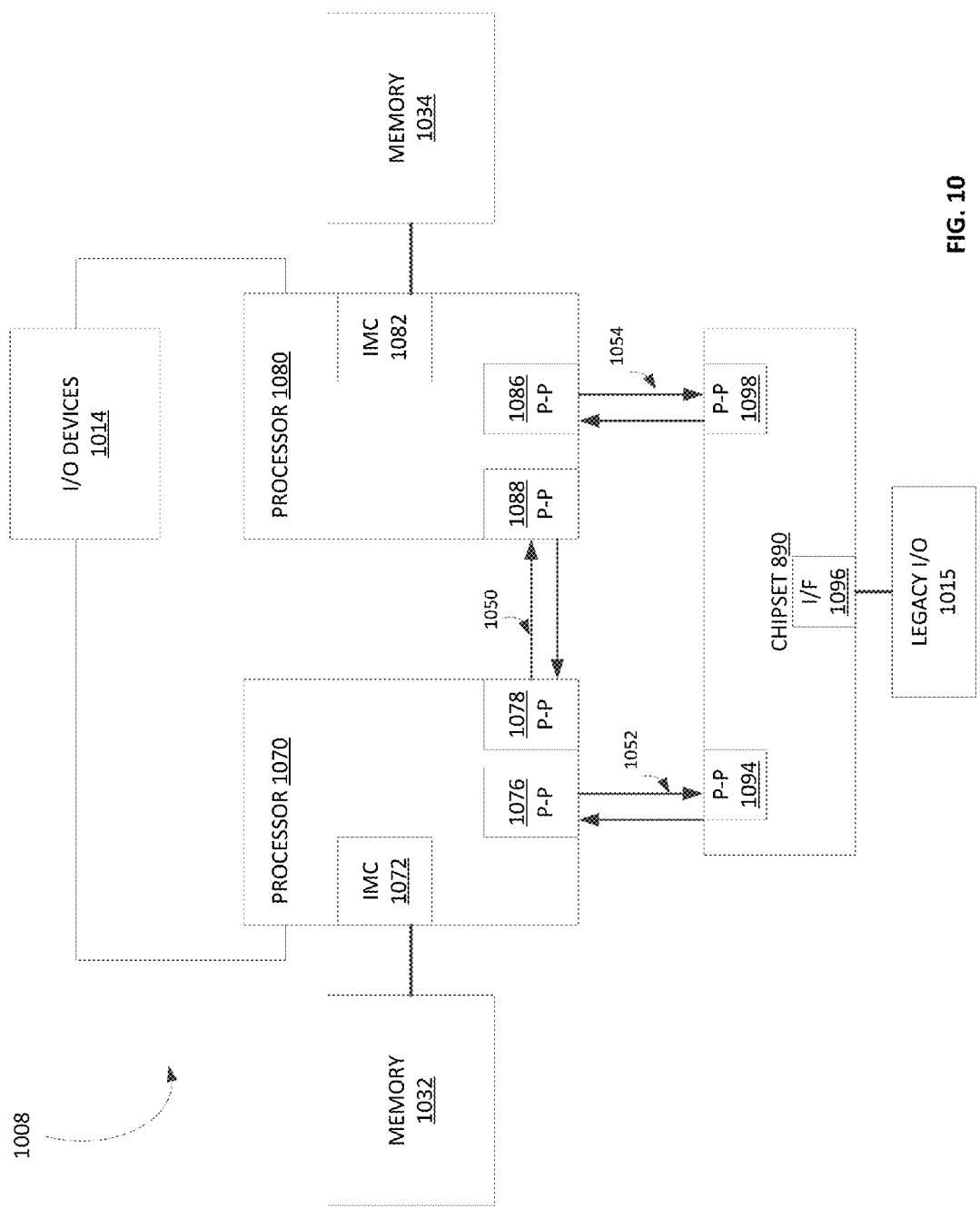
FIG. 10 illustrates a block diagram of a computer system according to one embodiment.

Referring now to FIG. 10, shown is a block diagram of a system 1000 in accordance with an embodiment of the invention. FIG. 10 illustrates processors 1070, 1080. In one embodiment, processors 1070, 1080 monitor performance of a processing device to manage events. Furthermore, processors 1070, 1080 may include integrated memory and I/O control logic ("CL") 1072 and 1082, respectively and intercommunicate with each other via point-to-point interconnect 1050 between point-to-point (P-P) interfaces 1078 and 1088 respectively. Processors 1070, 1080 each communicate with chipset 1090 via point-to-point interconnect 1052 and 1054 through the respective P-P interfaces 1076 to 1094 and 1086 to 1098 as shown. For at least one embodiment, the CL 1072, 1082 may include integrated memory controller units. CLs 1072, 1082 may include I/O control logic. As depicted, memories 1032, 1034 coupled to CLs 1072, 1082 and I/O devices 1014 are also coupled to the control logic 1072, 1082. Legacy I/O devices 1015 are coupled to the chipset 1090 via interface 1096.

Figure 11:
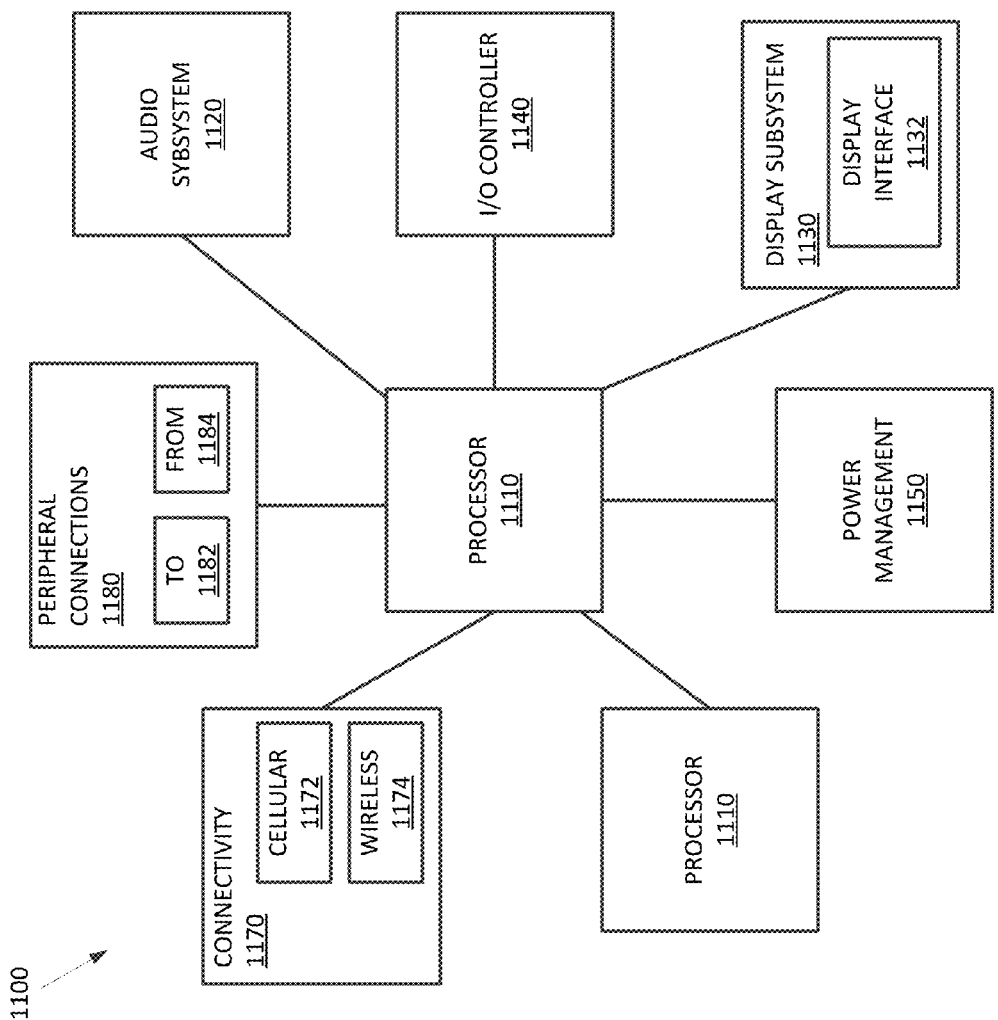
FIG. 11 illustrates block diagram of an embodiment of tablet computing device, a smartphone, or other mobile device in which touchscreen interface connectors are used.

FIG. 11 illustrates a block diagram 1100 of an embodiment of tablet computing device, a smartphone, or other mobile device in which touchscreen interface connectors may be used. Processor 1110 may monitor performance of a processing device to manage events. In addition, processor 1110 performs the primary processing operations. Audio subsystem 1120 represents hardware (e.g., audio hardware and audio circuits) and software (e.g., drivers, codecs) components associated with providing audio functions to the computing device. In one embodiment, a user interacts with the tablet computing device or smartphone by providing audio commands that are received and processed by processor 1110.

Display subsystem 1132 represents hardware (e.g., display devices) and software (e.g., drivers) components that provide a visual and/or tactile display for a user to interact with the tablet computing device or smartphone. Display subsystem 1130 includes display interface 1132, which includes the particular screen or hardware device used to provide a display to a user. In one embodiment, display subsystem 1130 includes a touchscreen device that provides both output and input to a user.

I/O controller 1140 represents hardware devices and software components related to interaction with a user. I/O controller 1140 can operate to manage hardware that is part of audio subsystem 1120 and/or display subsystem 1130. Additionally, I/O controller 1140 illustrates a connection point for additional devices that connect to the tablet computing device or smartphone through which a user might interact. In one embodiment, I/O controller 1140 manages devices such as accelerometers, cameras, light sensors or other environmental sensors, or other hardware that can be included in the tablet computing device or smartphone. The input can be part of direct user interaction, as well as providing environmental input to the tablet computing device or smartphone.

In one embodiment, the tablet computing device or smartphone includes power management 1150 that manages battery power usage, charging of the battery, and features related to power saving operation. Memory subsystem 1160 includes memory devices for storing information in the tablet computing device or smartphone. Connectivity 1170 includes hardware devices (e.g., wireless and/or wired connectors and communication hardware) and software components (e.g., drivers, protocol stacks) to the tablet computing device or smartphone to communicate with external devices. Cellular connectivity 1172 may include, for example, wireless carriers such as GSM (global system for mobile communications), CDMA (code division multiple access), TDM (time division multiplexing), or other cellular service standards). Wireless connectivity 1174 may include, for example, activity that is not cellular, such as personal area networks (e.g., Bluetooth), local area networks (e.g., WiFi), and/or wide area networks (e.g., WiMax), or other wireless communication.

Peripheral connections 1180 include hardware interfaces and connectors, as well as software components (e.g., drivers, protocol stacks) to make peripheral connections as a peripheral device ("to" 1182) to other computing devices, as well as have peripheral devices ("from" 1184) connected to the tablet computing device or smartphone, including, for example, a "docking" connector to connect with other computing devices. Peripheral connections 1180 include common or standards-based connectors, such as a Universal Serial Bus (USB) connector, DisplayPort including MiniDisplayPort (MDP), High Definition Multimedia Interface (HDMI), Firewire, etc.

Figure 12:
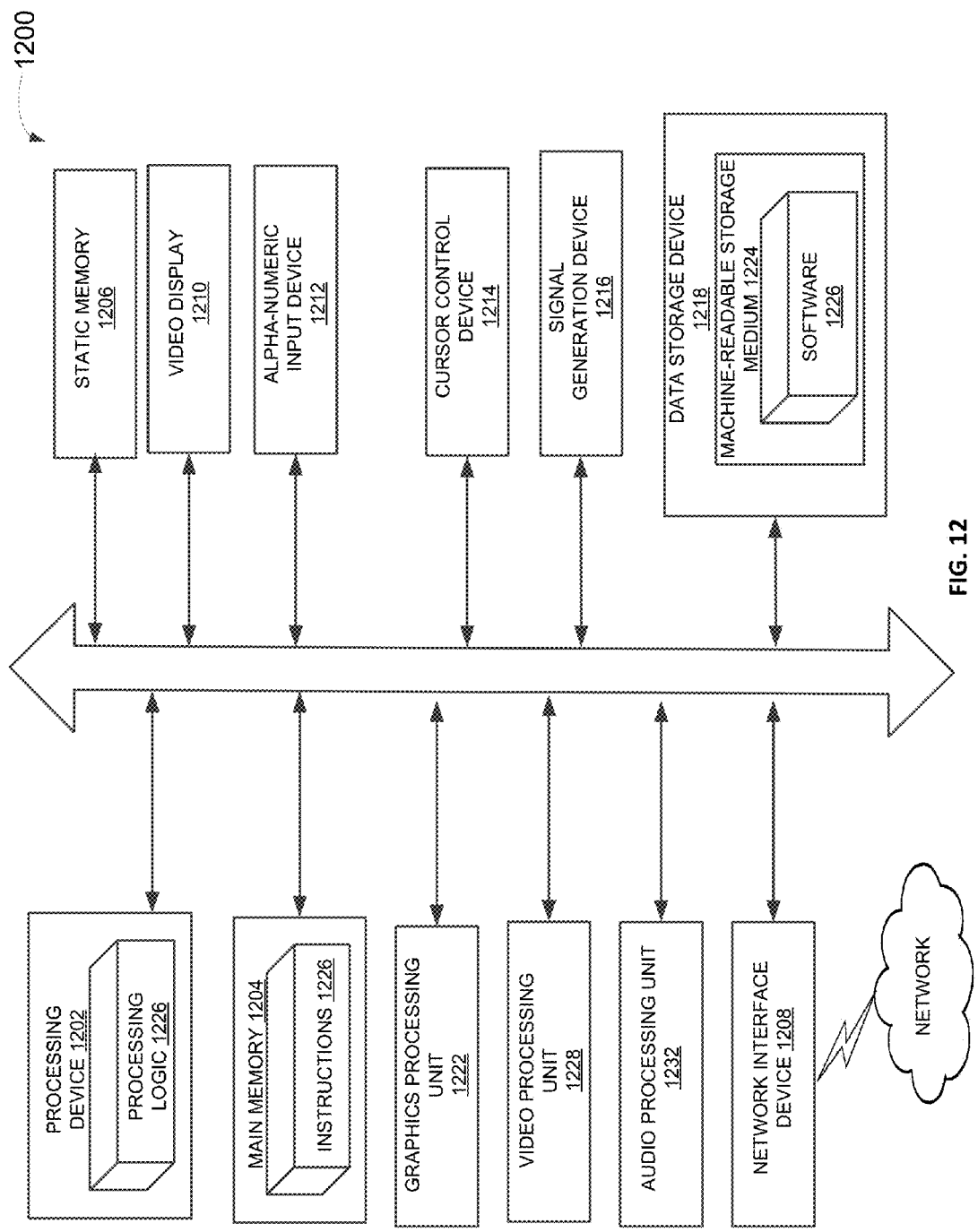
FIG. 12 illustrates a diagrammatic representation of a machine in the example form of a computer system within which a set of instructions, for causing the machine to perform any one or more of the methodologies discussed herein, may be executed.

FIG. 12 illustrates a diagrammatic representation of a machine in the example form of a computing system 1200 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computing system 1200 includes a processing device 1202, a main memory 1204 (e.g., read-only memory (ROM), flash memory, dynamic random access memory (DRAM) (such as synchronous DRAM (SDRAM) or DRAM (RDRAM), etc.), a static memory 1206 (e.g., flash memory, static random access memory (SRAM), etc.), and a data storage device 1218, which communicate with each other via a bus 1230.

Processing device 1202 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1202 may also be one or more special-purpose processing devices such as an application specific integrated circuit (ASIC), a field programmable gate array (FPGA), a digital signal processor (DSP), network processor, or the like. In one embodiment, processing device 1202 may include one or processing cores. The processing device 1202 is configured to execute the processing logic 1226 for performing the operations discussed herein. In one embodiment, processing device 1202 is the same as computer systems 100 and 200 as described with respect to FIG. 1 that implements the NPEBS module 106. Alternatively, the computing system 1200 can include other components as described herein.

The computing system 1200 may further include a network interface device 1208 communicably coupled to a network 1220. The computing system 1200 also may include a video display unit 1210 (e.g., a liquid crystal display (LCD) or a cathode ray tube (CRT)), an alphanumeric input device 1212 (e.g., a keyboard), a cursor control device 1214 (e.g., a mouse), a signal generation device 1216 (e.g., a speaker), or other peripheral devices. Furthermore, computing system 1200 may include a graphics processing unit 1222, a video processing unit 1228 and an audio processing unit 1232. In another embodiment, the computing system 1200 may include a chipset (not illustrated), which refers to a group of integrated circuits, or chips, that are designed to work with the processing device 1202 and controls communications between the processing device 1202 and external devices. For example, the chipset may be a set of chips on a motherboard that links the processing device 1202 to very high-speed devices, such as main memory 1204 and graphic controllers, as well as linking the processing device 1202 to lower-speed peripheral buses of peripherals, such as USB, PCI or ISA buses.

The data storage device 1218 may include a computer-readable storage medium 1224 on which is stored software 1226 embodying any one or more of the methodologies of functions described herein. The software 1226 may also reside, completely or at least partially, within the main memory 1204 as instructions 1226 and/or within the processing device 1202 as processing logic 1226 during execution thereof by the computing system 1200; the main memory 1204 and the processing device 1202 also constituting computer-readable storage media.

The computer-readable storage medium 1224 may also be used to store instructions 1226 and/or a software library containing methods that call the above applications. The EBS module 106 described with respect to FIG. 1 may be utilized to indicate where EBS records should go, how many EBS records should be stored before an interrupt is generated, processing of the EBS records, and so forth. While the computer-readable storage medium 1224 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instruction for execution by the machine and that cause the machine to perform any one or more of the methodologies of the embodiments. The term "computer-readable storage medium" shall accordingly be taken to include, but not be limited to, solid-state memories, and optical and magnetic media. While the invention has been described with respect to a limited number of embodiments, those skilled in the art will appreciate numerous modifications and variations therefrom. It is intended that the appended claims cover all such modifications and variations as fall within the true spirit and scope of this invention.

The following examples pertain to further embodiments.

Example 1 is a processor monitoring performance of a processor to manage events comprising a first performance counter to increment upon occurrence of a first type of event in the processor, wherein one or more registers to store software-visible control bits; a first performance counter to increment upon occurrence of a first type of event in the processor, wherein the first performance counter to increment from a first starting value to a first limit; a second performance counter to increment upon occurrence of a second type of event in the processor, wherein the second performance counter to increment from a second starting value to a second limit; control logic to receive an indication of the first performance counter reaching the first limit, access a reload enable bit of the software-visible control bits, and send a control signal in view of the reload enable bit; and reload logic to reset the second performance counter to a second reload value in response to receiving the control signal from the control logic.

In Example 2, the subject matter of Example 1 can optionally includewherein in response to the control logic receiving a second indication of the second performance counter reaching the second limit, the control logic to access a second reload enable bit of the software-visible control bits and send a second control signal in view of the second reload enable bit, and the reload logic to reset the first performance counter to a first reload value in response to receiving the second control signal from the control logic.

In Example 3, the subject matter of any one of Examples 1-2 can optionally include wherein in response to the control logic receiving the indication, the control logic to access a third reload enable bit of the software-visible control bits and send a third control signal in view of the third reload enable bit, the reload logic to reset the first performance counter to the first reload value in response to receiving the third control signal from the control logic, in response to the control logic receiving the second indication, the control logic to access a fourth reload enable bit of the software-visible control bits and send a fourth control signal in view of the fourth reload enable bit, and the reload logic to reset the second performance counter to the second reload value in response to receiving the fourth control signal from the control logic.

In Example 4, the subject matter of any one of Examples 1-3 can optionally include an event based sampling (EBS) component to generate a record in response to the second performance counter reaching the second limit, wherein the EBS record comprises architectural metadata defining a state of the processor at a time of generation of the EBS record.

In Example 5, the subject matter of any one of Examples 1-4 can optionally include wherein the EBS component is an EBS handler comprising a memory storage to store the EBS record generated in response to the second performance counter reaching the second limit, wherein the EBS handler is enabled via an EBS enable control to generate the EBS record in response to the second performance counter reaching the second limit.

In Example 6, the subject matter of any one of Examples 1-5 can optionally include an interrupt component to generate an interrupt in response to the second performance counter reaching the second limit.

In Example 7, the subject matter of any one of Examples 1-6 can optionally include wherein the interrupt component is enabled via an interrupt enable control to generate an interrupt in response to the second performance counter reaching the second limit.

In Example 8, the subject matter of any one of Examples 1-7 can optionally include a first event select (ES) control programmed with a first identifier of the first type of event, wherein the first performance counter is enabled via the first ES control to increment upon occurrence of the first type of event; and a second ES control programmed with a second identifier of the second type of event, wherein the second performance counter is enabled via the second ES control to increment upon occurrence of the second type of event.

In Example 9, the subject matter of any one of Examples 1-8 can optionally include one or more hardware registers to store a first reload value and the second reload value, wherein the first reload value is the first starting value and the second reload value is the second starting value.

In Example 10, the subject matter of any one of Examples 1-9 can optionally include wherein the first performance counter and the second performance counter are both fixed performance counters.

In Example 11, the subject matter of any one of Examples 1-10 can optionally include wherein a first counter of the first performance counter and the second performance counter is a fixed performance counter and a second counter of the first performance counter and the second performance counter is a general-purpose performance counter.

In Example 12, the subject matter of any one of Examples 1-11 can optionally include a first software-visible register with a first plurality of control bits, wherein the first software-visible register corresponds to the first performance counter, wherein the first plurality of control bits comprises: the reload enable bit; and a fifth reload enable bit, wherein in response to the control logic receiving the indication, the control logic to access the fifth reload enable bit of the software-visible control bits and send a fifth control signal in view of the fifth reload enable bit, and the reload logic to reset a third performance counter to a third reload value in response to receiving the fifth control signal from the control logic; a second software-visible register with a second plurality of control bits, wherein the second software-visible register corresponds to the second performance counter, wherein the second plurality of control bits comprises: the second reload enable bit; and a sixth reload enable bit, wherein in response to the control logic receiving the second indication, the control logic to access the sixth reload enable bit of the software-visible control bits and send a sixth control signal in view of the sixth reload enable bit, and the reload logic to reset the third performance counter to the third reload value in response to receiving the sixth control signal from the control logic.

Example 13 is a method for monitoring performance of a processor to manage events comprising incrementing a first value in a first performance counter upon occurrence of a first type of event in a processor, wherein the incrementing the first value is from a first starting value to a first limit; incrementing a second value in a second performance counter upon occurrence of a second type of event in the processor, wherein the incrementing the second value is from a second starting value to a second limit; receiving an indication of the first performance counter reaching the first limit; accessing a reload enable bit in view of the indication; sending a control signal in view of the reload enable bit; and resetting the second performance counter to a second reload value in response to the sending of the control signal.

In Example 14, the subject matter of Example 13 can optionally include receiving a second indication of the second performance counter reaching the second limit; accessing a second reload enable bit in view of the second indication; sending a second control signal in view of the second reload enable bit; and resetting the first performance counter to a first reload value in response to the sending of the second control signal.

In Example 15, the subject matter of any one of Examples 13-14 can optionally include causing an event based sampling (EBS) component to generate and store an EBS record in response to the second performance counter reaching the second limit, wherein the EBS record comprises an architectural metadata defining a state of the processor at a time of generation of the EBS record.

In Example 16, the subject matter of any one of Examples 13-15 can optionally include causing an interrupt component to generate an interrupt in response to the second performance counter reaching the second limit.

Example 17 is a processor monitoring performance of a processor to manage events comprising one or more registers to store software-visible control bits; a first performance counter to increment upon occurrence of a first type of event in the processor, wherein the first performance counter to increment from a first starting value to a first limit; a second performance counter to increment upon occurrence of a second type of event in the processor, wherein the second performance counter to increment from a second starting value to a second limit; a third performance counter to increment upon occurrence of a third type of event in the processor, wherein the third performance counter to increment from a third starting value to a third limit; control logic to receive an indication of the first performance counter reaching the first limit, access a first reload enable bit and a second reload enable bit of the software-visible control bits, send a first control signal in view of the first reload enable bit and a second control signal in view of the second reload enable bit; and reload logic to reset the second performance counter to a second reload value in response to receiving the first control signal from the control logic and reset the third performance counter to a third reload value in response to receiving the second control signal from the control logic.

In Example 18, the subject matter of Example 17 can optionally include in response to the control logic receiving a second indication of the second performance counter reaching the second limit, the control logic to access a third reload enable bit and a fourth reload enable bit of the software-visible control bits and send a third control signal in view of the third reload enable bit and a fourth control signal in view of the fourth reload enable bit, the reload logic to reset the first performance counter to a first reload value in response to receiving the third control signal from the control logic and reset the third performance counter to a third reload value in response to receiving the fourth control signal from the control logic, in response to the control logic receiving a third indication of the third performance counter reaching the third limit, the control logic to access a fifth reload enable bit and a sixth reload enable bit of the software-visible control bits and send a fifth control signal in view of the fifth reload enable bit and a sixth control signal in view of the sixth reload enable bit, and the reload logic to reset the first performance counter to a first reload value in response to receiving the fifth control signal from the control logic and reset the second performance counter to a second reload value in response to receiving the sixth control signal from the control logic.

In Example 19, the subject matter of any one of Examples 17-18 can optionally include an EBS component to generate an EBS record in response to at least one of the second performance counter reaching the second limit or the third performance counter reaching the third limit, wherein the EBS record comprises architectural metadata defining a state of the processor at a time of generation of the EBS record.

In Example 20, the subject matter of any one of Examples 17-19 can optionally include an interrupt component to generate an interrupt in response to at least one of the second performance counter reaching the second limit or the third performance counter reaching the third limit.

Example 21 is a system on a chip (SoC) processor monitoring performance of a SoC to manage events comprising a plurality of processors; a memory device; one or more registers to store software-visible control bits; one or more hardware registers to store a first reload value and a second reload value; a first performance counter to increment upon occurrence of a first type of event in a processor of the plurality of processors, wherein the first performance counter to increment from a first starting value to a first limit; a second performance counter to increment upon occurrence of a second type of event in the processor, wherein the second performance counter to increment from a second starting value to a second limit; control logic to receive an indication of the first performance counter reaching the first limit, access a reload enable bit of the software-visible control bits, and send a control signal in view of the reload enable bit; and reload logic to reset the second performance counter to the second reload value in response to receiving the control signal from the control logic.

In Example 22, the subject matter of Example 21 can optionally include wherein in response to the control logic receiving a second indication of the second performance counter reaching the second limit, the control logic to access a second reload enable bit of the software-visible control bits and send a second control signal in view of the second reload enable bit, and the reload logic to reset the first performance counter to a first reload value in response to receiving the second control signal from the control logic.

In Example 23, the subject matter of any one of Examples 21-22 can optionally include an EBS component to generate an EBS record in response to the second performance counter reaching the second limit, wherein the EBS record comprises architectural metadata defining a state of the processor at a time of generation of the EBS record.

In Example 24, the subject matter of any one of Examples 21-23 can optionally include an interrupt component to generate an interrupt in response to the second performance counter reaching the second limit.

Various embodiments may have different combinations of the structural features described above. For instance, all optional features of the SoC described above may also be implemented with respect to a processor described herein and specifics in the examples may be used anywhere in one or more embodiments.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 910 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. A processor comprising:
a first performance counter to increment upon occurrence of a first type of event in the processor; and
a second performance counter to increment upon occurrence of a second type of event in the processor, wherein the processor is to reset the second performance counter in response to the first performance counter reaching a first limit.

2. The processor of claim 1, wherein the processor is to generate a record in response to the second performance counter reaching a second limit.

3. The processor of claim 2, wherein the record defines a state of the processor at a time of generation of the record.

4. The processor of claim 1, wherein the processor is to generate an interrupt in response to the second performance counter reaching a second limit.

5. The processor of claim 1, wherein the processor is to monitor performance of the processor based on the second performance counter reaching a second limit.

6. The processor of claim 1, wherein the processor is to perform event based sampling based on the second performance counter reaching a second limit.

7. The processor of claim 1, wherein the processor is to determine that the processor is operating at an unexpected rate based on the second performance counter reaching a second limit.

8. A method comprising:
incrementing a first value in a first performance counter upon occurrence of a first type of event in a processor;
incrementing a second value in a second performance counter upon occurrence of a second type of event in the processor; and
resetting the second performance counter in response to the first performance counter reaching a first limit.

9. The method of claim 8 further comprising generating a record in response to the second performance counter reaching a second limit.

10. The method of claim 9, wherein the record defines a state of the processor at a time of generation of the record.

11. The method of claim 8 further comprising generating an interrupt in response to the second performance counter reaching a second limit.

12. The method of claim 8 further comprising monitoring performance of the processor based on the second performance counter reaching a second limit.

13. The method of claim 8 further comprising performing event based sampling based on the second performance counter reaching a second limit.

14. The method of claim 8 further comprising determining that the processor is operating at an unexpected rate based on the second performance counter reaching a second limit.

15. A system on a chip (SoC) comprising:
a plurality of processors;
a memory device;
a first performance counter to increment upon occurrence of a first type of event in a processor of the plurality of processors; and
a second performance counter to increment upon occurrence of a second type of event in the processor, wherein the processor is to reset the second performance counter in response to the first performance counter reaching a first limit.

16. The SoC of claim 15, wherein the processor is to generate a record in response to the second performance counter reaching a second limit.

17. The SoC of claim 16, wherein the record defines a state of the processor at a time of generation of the record.

18. The SoC of claim 15, wherein the processor is to generate an interrupt in response to the second performance counter reaching a second limit.

19. The SoC of claim 15, wherein the processor is to monitor performance of the processor based on the second performance counter reaching a second limit.

20. The SoC of claim 15, wherein the processor is to perform event based sampling based on the second performance counter reaching a second limit.

* * * * *